(12) United States Patent
Domschot

(10) Patent No.: US 6,512,195 B2
(45) Date of Patent: Jan. 28, 2003

(54) MODULAR WELDING MACHINE

(76) Inventor: Bryan W. Domschot, 11347 Berry Rd., Blissfield, MI (US) 49228

( * ) Notice: Subject to any disclaimer, the term of this patent is extended or adjusted under 35 U.S.C. 154(b) by 0 days.

(21) Appl. No.: 09/921,738

(22) Filed: Aug. 3, 2001

(65) Prior Publication Data

US 2002/0011470 A1 Jan. 31, 2002

Related U.S. Application Data

(63) Continuation-in-part of application No. 09/467,254, filed on Dec. 20, 1999, now Pat. No. 6,271,496.

(51) Int. Cl.$^7$ .............................. B23K 9/32; B23K 11/10
(52) U.S. Cl. .................... 219/86.25; 219/86.8; 219/158
(58) Field of Search ............................ 219/86.25, 86.8, 219/158, 160; 228/49.1, 44.3

(56) References Cited

U.S. PATENT DOCUMENTS

| | | |
|---|---|---|
| 3,148,264 A | 9/1964 | Van Alan Clark, Jr. et al. |
| 3,970,232 A * | 7/1976 | Melton |
| 4,473,734 A | 9/1984 | Henry |
| 4,582,979 A * | 4/1986 | Moerke |
| 4,594,494 A | 6/1986 | Henry et al. |
| 4,893,398 A | 1/1990 | Zimmer |
| 5,093,977 A | 3/1992 | Muller et al. |
| 5,763,850 A * | 6/1998 | Hardt |
| 5,831,234 A * | 11/1998 | Nakamura et al. |
| 6,013,891 A * | 1/2000 | Stempfer |
| 6,072,146 A | 6/2000 | Matuschek et al. |
| 6,271,496 B1 * | 8/2001 | Domschot |
| 6,279,224 B1 * | 8/2001 | Wirtz et al. |

OTHER PUBLICATIONS

US 2002/0011470 A1 Domschot (Jan. 31, 2002).*
WO 01/45890 A1 Domschot (Jun. 28, 2001).*

* cited by examiner

Primary Examiner—Tom Dunn
Assistant Examiner—Kiley Stoner
(74) Attorney, Agent, or Firm—Reising, Ethington, Barnes, Kisselle, Learman & McCulloch, P.C

(57) ABSTRACT

A machine is disclosed with interchangeable tooling modules for use in a base operating machine. Disconnectible welding current contactor members connect the tooling module to a power supply/transformer of the base operating machine when the module is installed. The module is movable on a guide between uninstalled and installed locations and the contactor members are closed upon installation of the module. A set of fluid pressure and electrical connector members have complementary mating parts mounted on a module connector plate and on a machine connector plate of the base operating machine. An actuator moves the machine connector plate from a retracted position to an extended position for connecting the complementary connector members after the module is installed.

27 Claims, 21 Drawing Sheets

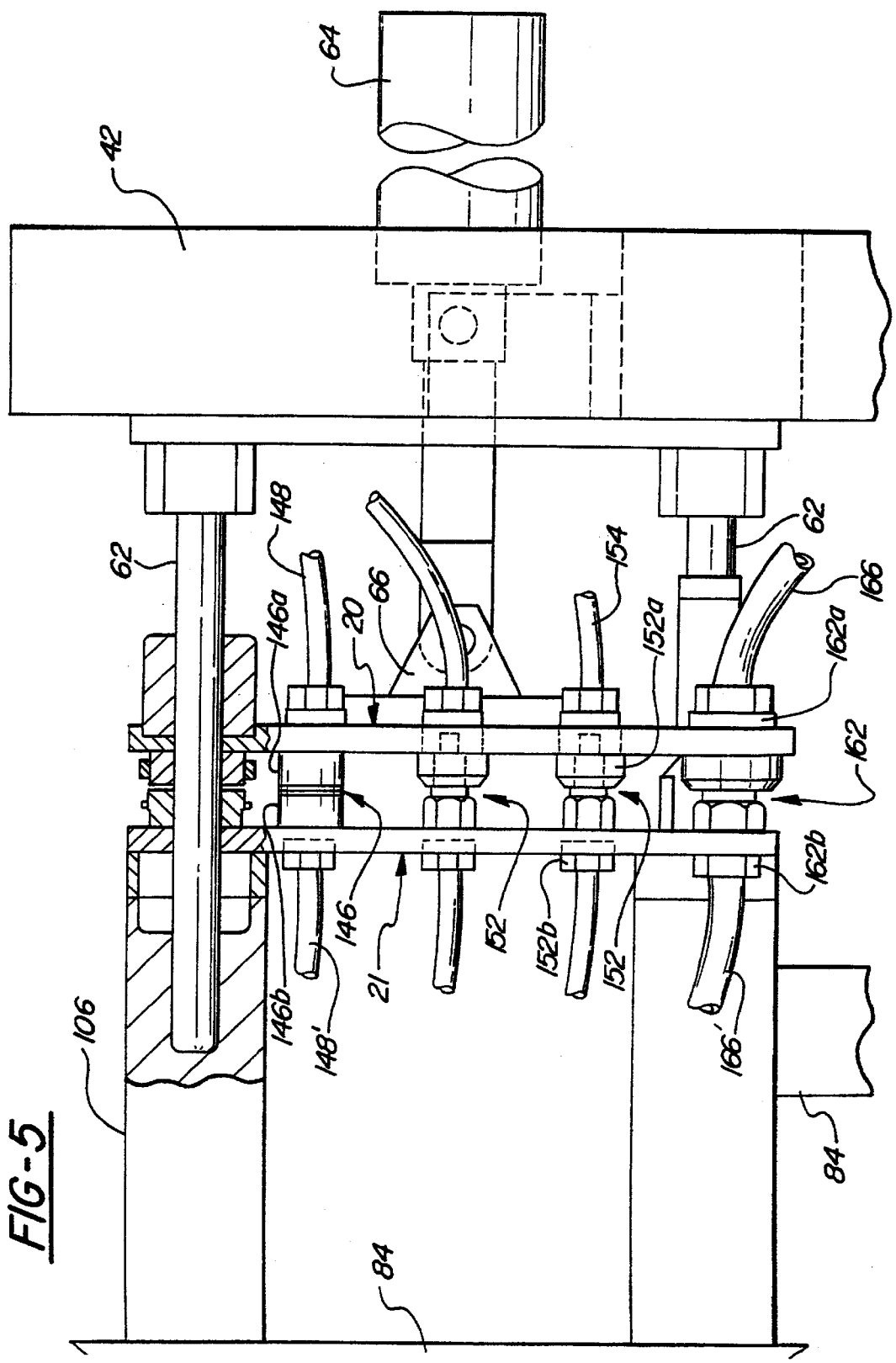

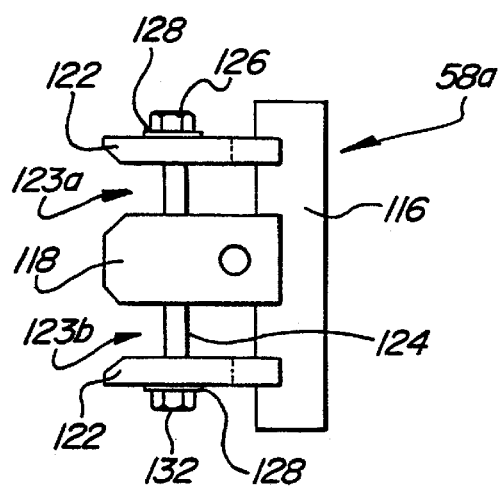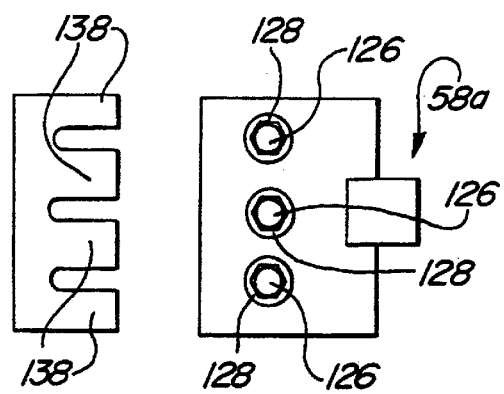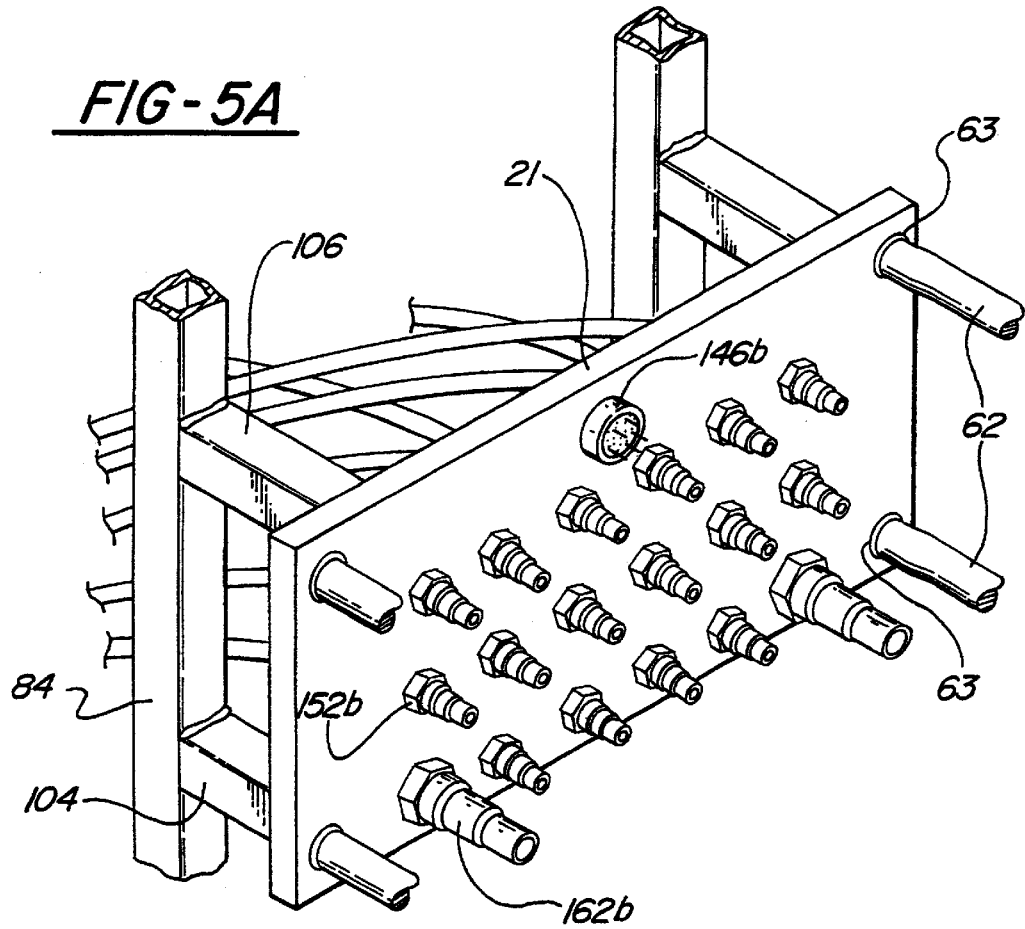

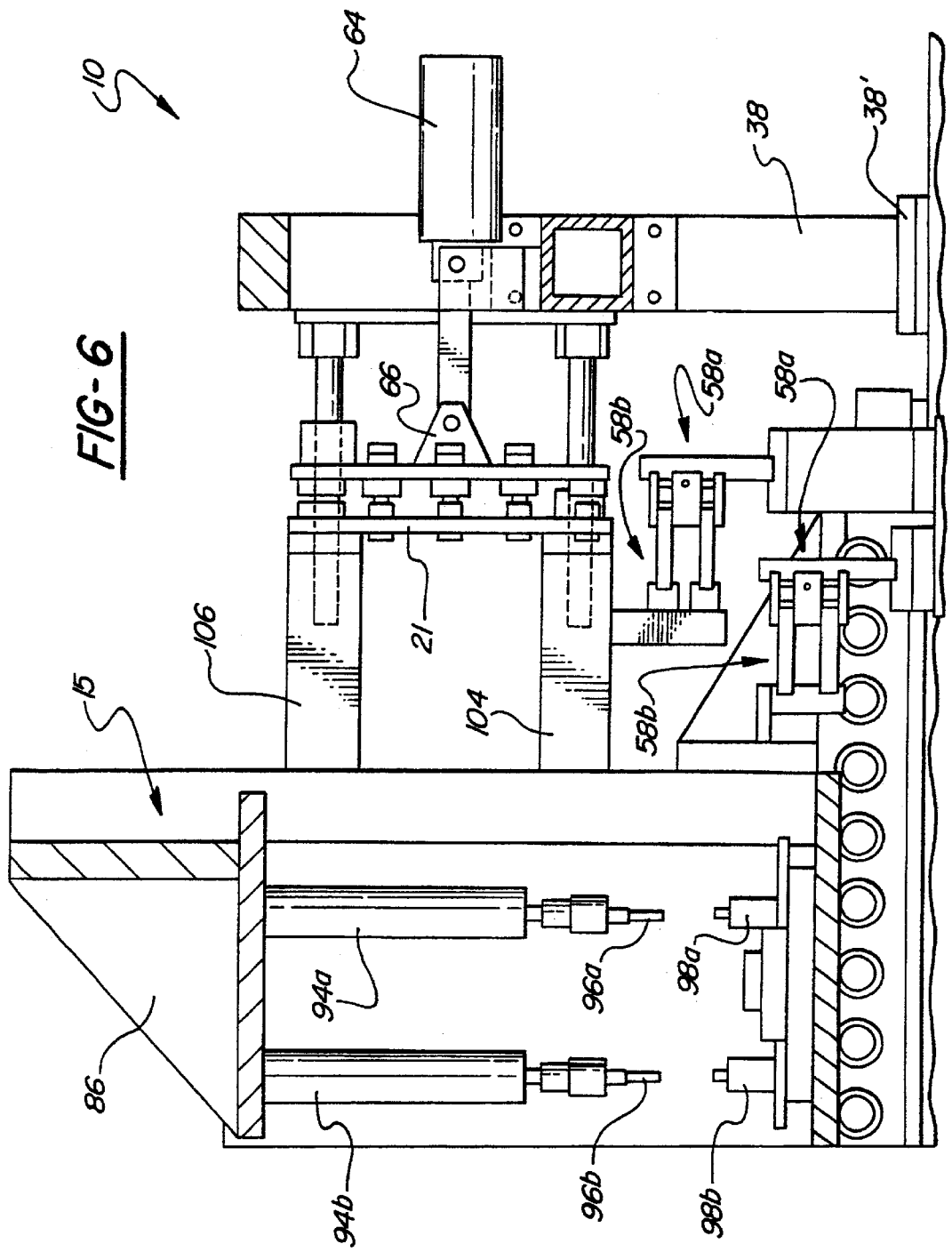

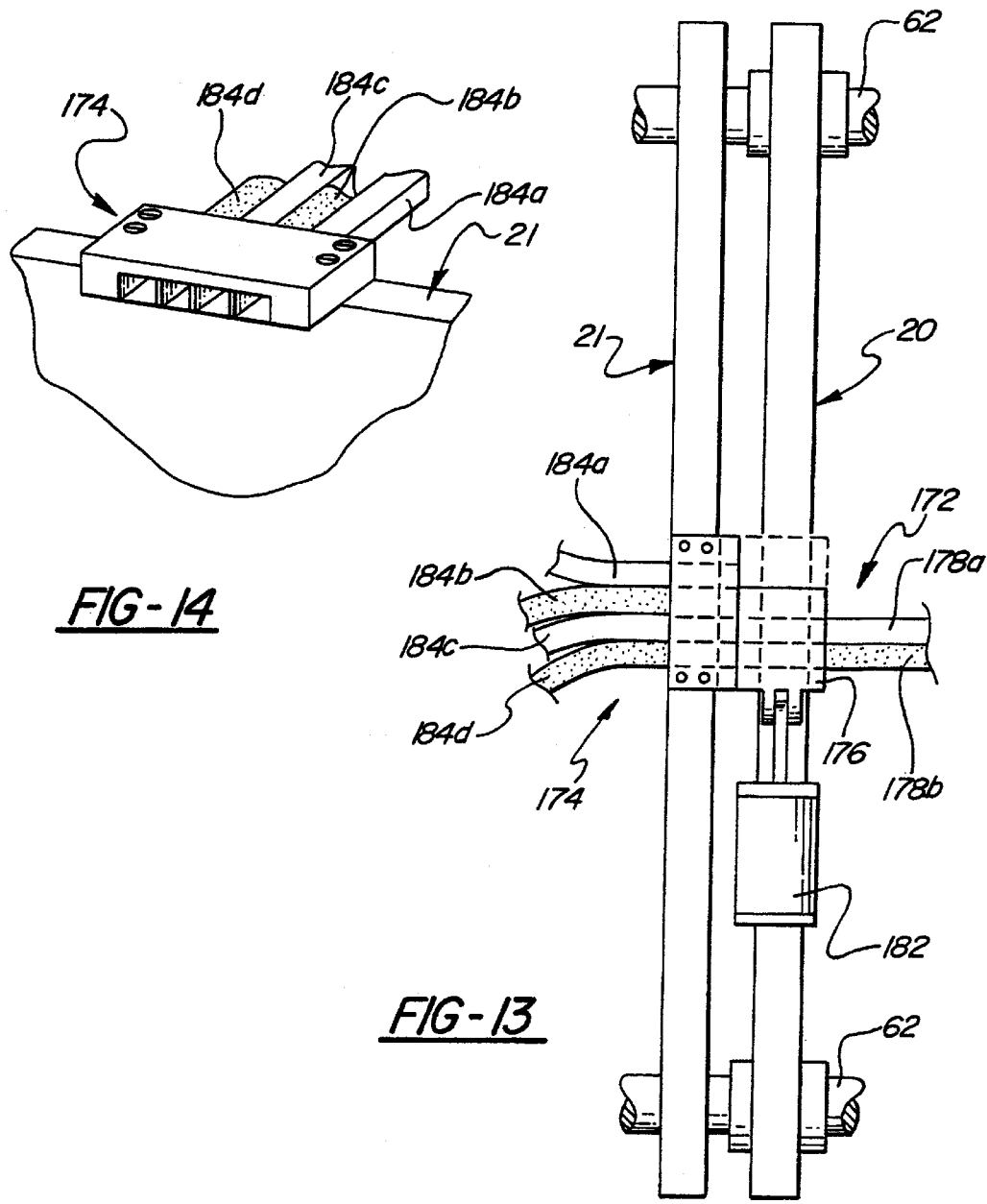

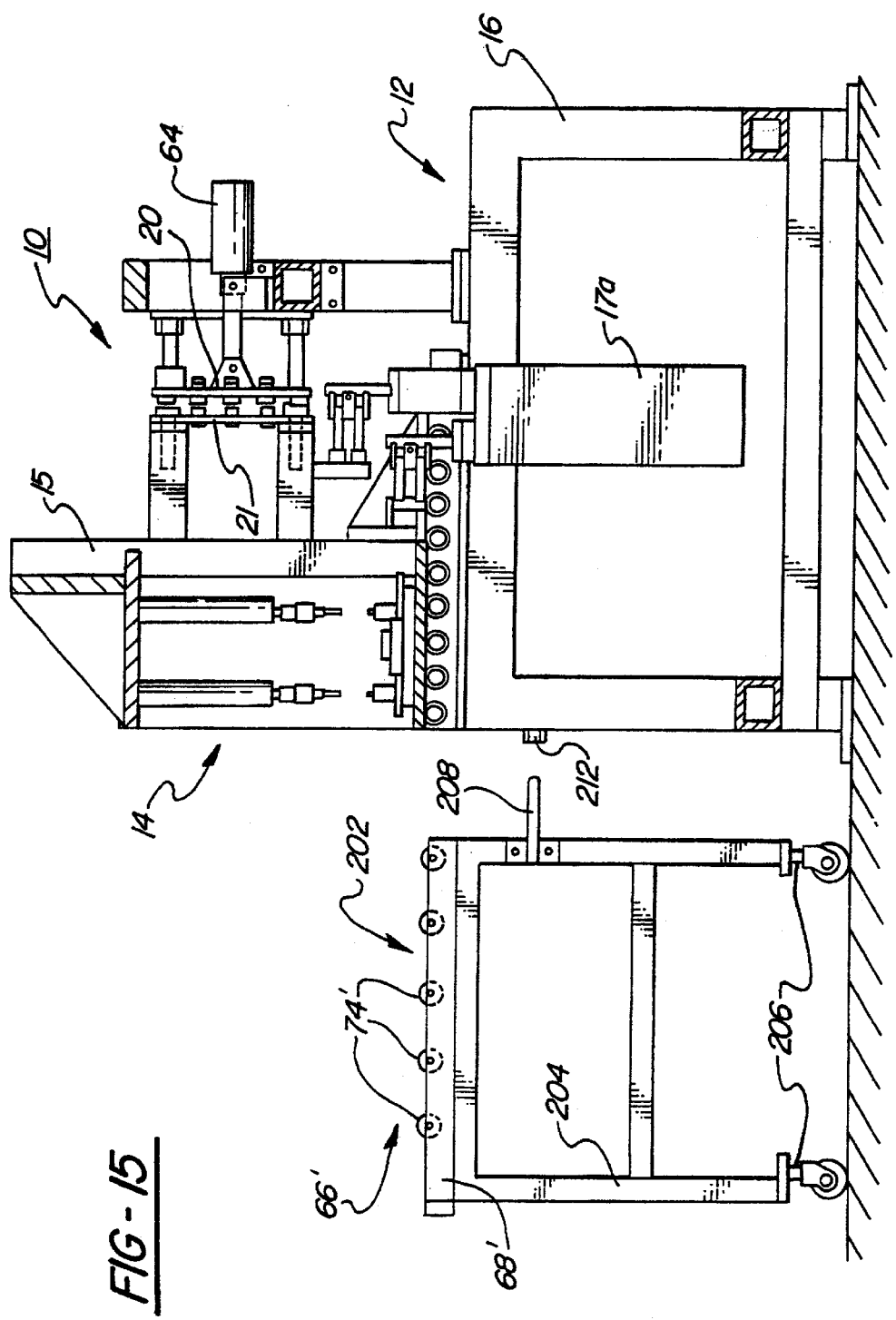

MODULAR WELDING MACHINE

This application is a CIP 09/467,254 filed Dec. 20, 1999 now U.S. Pat. No. 6,271,496.

FIELD OF THE INVENTION

This invention relates to welding machines of the type used in manufacturing plants for production of welded parts. More particularly, it relates to electric welding machines such as resistance welders and metal-inert gas (MIG) welders.

BACKGROUND OF THE INVENTION

It has been a common practice in the welding machine industry to build welding machines with custom tooling as an integral part of the welding machine. In this practice, especially in connection with resistance and MIG welding machines, each machine is dedicated to the manufacture of a particular part and is not useable for manufacture of other parts. The working area of such a dedicated machine includes an attached assembly of fixtures and tools specifically made, located and adjusted to produce the parts to which the machine is dedicated. The entire machine, from heavy frame to built-in precision fixtures is treated as capital equipment on the financial books of the purchaser. When the parts produced by the dedicated machine are no longer needed, the entire machine is generally scrapped.

There has been a longstanding need in the industry to overcome the disadvantages which accompany the practice of using dedicated welding machines such as the economic loss from scrapping the entire machine when the tools and fixtures are no longer usable because of wear and tear or because of termination of production of the part to which the machine is dedicated. A general objective of this invention is to provide a solution to the problem of economic loss associated with dedicated machines by extending the useful life of those parts of the machine which are not dedicated to a particular product. That part of a given machine, except for the dedicated fixtures and tooling, is herein sometimes referred to as the "base operating machine" whereas the dedicated fixtures and tooling are herein referred to as a "tooling module".

In the prior art, the Henry U.S. Pat. Nos. 4,473,734 and 4,594,494 granted Sep. 25, 1984 and Jun. 10, 1986, respectively, describe a base machine which is adapted to receive interchangeable welding modules. These patents describe an arrangement wherein the base machine is provided with a welding head and a foot treadle actuating device for the upper electrode. Welding current is supplied in the base machine through conductors connected to a conductive base member and to the welding head. The welding electrodes receive welding current through a conductive plate on the module and a movable contact in the welding head.

In Muller et al. U.S. Pat. No. 5,093,977 granted Mar. 10, 1992, a welding machine is described which is adapted for processing differently shaped workpieces with a controlled tool changing capability for quick change of the set of tools. In this system, a central work station is provided with a workpiece holder. More than one tool frame is mounted on the machine and each tool frame may be moved from one station to another. When the processing of the workpiece has been completed by a selected tool frame at the central work station, the processed part may be conveyed out of the station. If other processing operations are to be carried out on the same workpiece or if the processing of a workpiece of a different shape is desired, another tool frame is moved into the central work section after the previous tool frame has been moved out. The processing of the workpiece is accomplished by the substituted tool frame.

It is a general object of this invention to provide a modular welding machine which overcomes certain disadvantages of the prior art.

SUMMARY OF THE INVENTION

In accordance with this invention, a modular welding machine comprises a base operating machine which coacts with a removable tooling module which is operatively coupled with the base operating machine to receive actuator fluid pressure supply and electrical signals through quick disconnect connectors of the push/pull type. Further, according to the invention, when the tooling module moved is into its installed position the weld current contactor members on tool module are engaged with the contactor members on the base operating machine.

Further, according to the invention, a machine connector plate supports a plurality of connector members and a tooling module connector plate supports a plurality of complementary connector members for mating engagement with the connector members on the machine connector plate when the tooling module is situated in the installed position. Preferably, mating engagement is carried out by actuation of the machine connector plate to engage the module connector plate. Preferably, the connector plates carry first and second locating members respectively for aligning said complementary connector members for movement into operative engagement.

Further, in accordance with the invention, the tooling module and the base operating machine are provided with coacting guide means for facilitating movement of the tooling module into or out of the installed position of the module. Preferably, a module transfer cart is provided with alignment means coacting with said base operating machine with guide means on the transfer cart for moving the tooling module onto the guide means of the base operating machine.

Further, in accordance with this invention, interlock means are provided to inhibit operation of the welding machine unless the tooling module is properly installed in the base operating machine.

Further, in accordance with the invention, a parts transfer device may be provided with complementary parts mounted respectively on the machine connector plate and the module connector plate for feeding small parts from the base operating machine to a workpiece positioned on the module.

A complete understanding of this invention may be obtained from the detailed description that follows taken with the accompanying drawings.

DESCRIPTION OF THE DRAWINGS

FIG. 5 is an enlarged view of a portion of FIG. 2;

FIG. 5A is a perspective view of a connector plate;

FIG. 6 is an enlarged view of another portion of FIG. 2;

FIGS. 7, 8, 9, 10, 11 and 12 show details of the electrical contactors for a welding transformer;

FIGS. 13 and 14 depict a parts feeder mounted on the welding machine;

FIG. 15 is a side elevation view of a module cart for loading a tooling module into the welding machine;

BEST MODE FOR CARRYING OUT THE INVENTION

Figure 1:
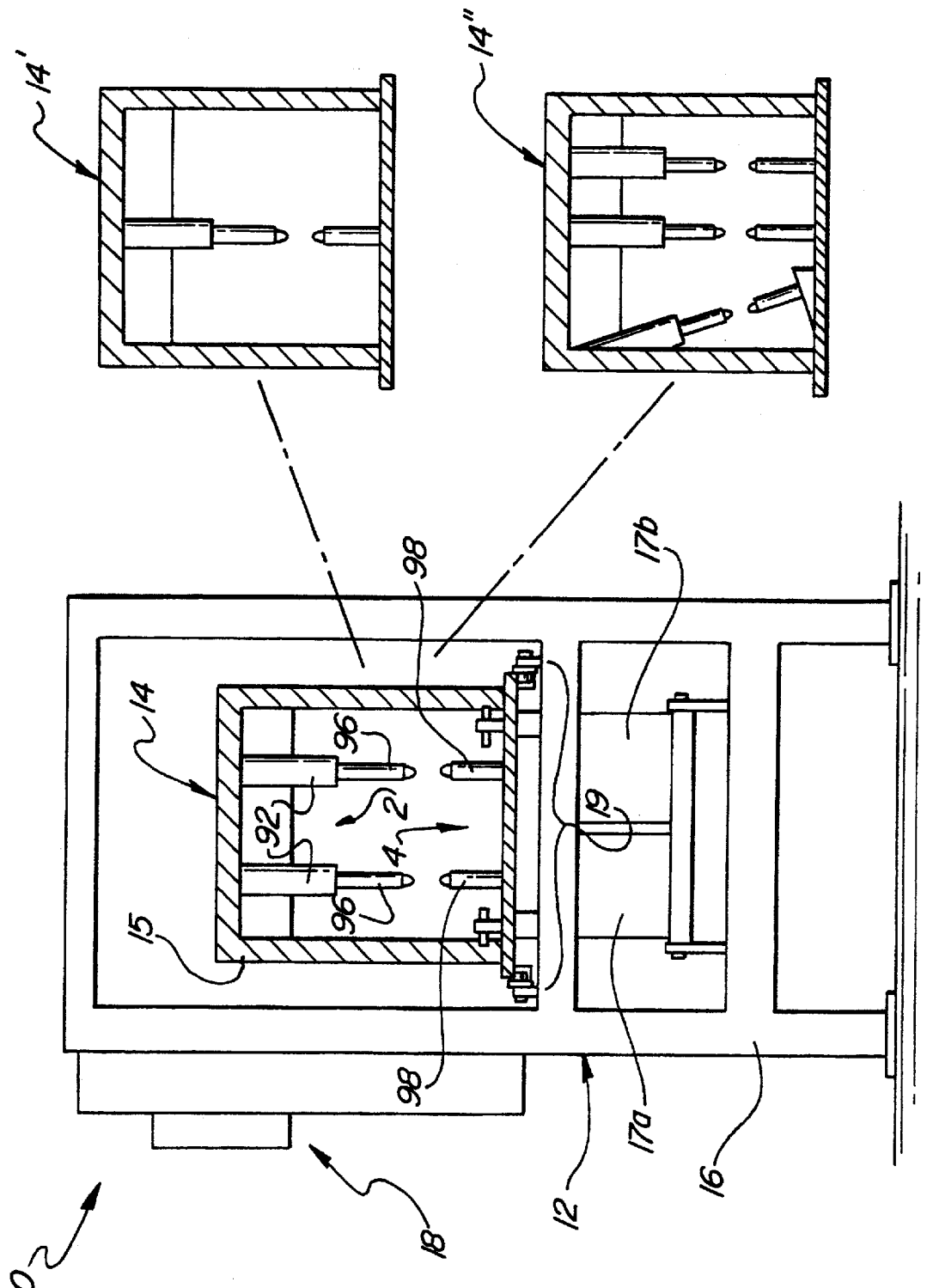
FIG. 1 depicts a welding machine, according to this invention, having a set of tooling modules for use one at a time as a part of the machine.

The description that follows will set forth the best mode for carrying out the invention by describing illustrative embodiments of the inventive modular welding machine as presently contemplated. This invention is especially adapted for use with electric welding machines of all types. As the term is used herein, an electric welding machine is a machine which produces a weldment by a process which includes passing an electric current through the part or parts to be welded. A first exemplary embodiment, together with certain alternative embodiments, modifications and variations, is a resistance welding machine of the spot welding type which is adapted for volume production of welded parts in a manufacturing plant. A second exemplary embodiment, together with certain alternative embodiments, modification and variations, is an arc welding machine of the metal-inert gas (MIG) type which is also adapted for high volume production of welded parts.

Referring now to the drawings, the first exemplary embodiment of the invention will be described with reference to FIGS. 1–19 and the second exemplary embodiment will be described with reference to FIGS. 20, 21 and 22. It will be appreciated as the description proceeds that the invention is useful in a wide variety of applications and may be realized in many different embodiments.

First Embodiment—General Description

A first embodiment of a modular welding machine 10 according to this invention is illustrated in FIG. 1. The welding machine 10 is a resistance welder of the spot welding type. It comprises, in general, a base operating machine 12 and a tooling module 14 installed in the base operating machine. The base operating machine comprises, in general, a machine frame 16, welding transformers 17a, 17b and 17c, a control cabinet 18 and other components which are required for operation of the tooling of the welding machine. The tooling module 14 comprises a module frame 15 which supports the tooling components required for a particular welding job or product which is to be run on the machine. The welding module is installed in the machine as a unit and is removable as a unit as needed for maintenance, repair or for replacement by another tooling module. As shown in FIG. 1, several different tooling modules such as modules 14a, 14b and 14c may be kept in standby condition which are tooled for particular production jobs which may be needed in the future. The base operating machine 12 and the tooling module 14 will be described in greater detail below.

Before proceeding with detailed description of the welding machine 10, an overview of the modular arrangement will be given. The modular welding machine 10 as described with reference to FIG. 1, is a two part machine; the first part is the base operating machine 12 and the second part is the tooling module 14. The tooling module includes the module frame 15 which supports the upper tooling 2 including one or more welding guns 92 and upper electrodes 96. The module frame also supports the lower tooling 4 which includes lower electrodes 98. The upper and lower tooling are disposed in an arrangement for performing welding operations on a particular workpiece. The tooling module also includes special electrical contactors (58b in FIG. 7) for receiving welding current from the base operating machine and a special connector arrangement (module connector plate 21, FIG. 2) for fluid pressure and electrical communication with the base operating machine. The tooling module is adapted for a specific job only. The base operating machine 12 of the welding machine 10 includes a machine frame 16 with a module support rack 19. The base operating machine includes special electrical contactors (58a in FIG. 7) which mate with those of the module for supplying welding current to the electrodes and a special connector arrangement (machine connector plate 20, FIG. 2) which mates with that of the module for supplying fluid pressure and electrical signals to and from the module.

Figure 2:
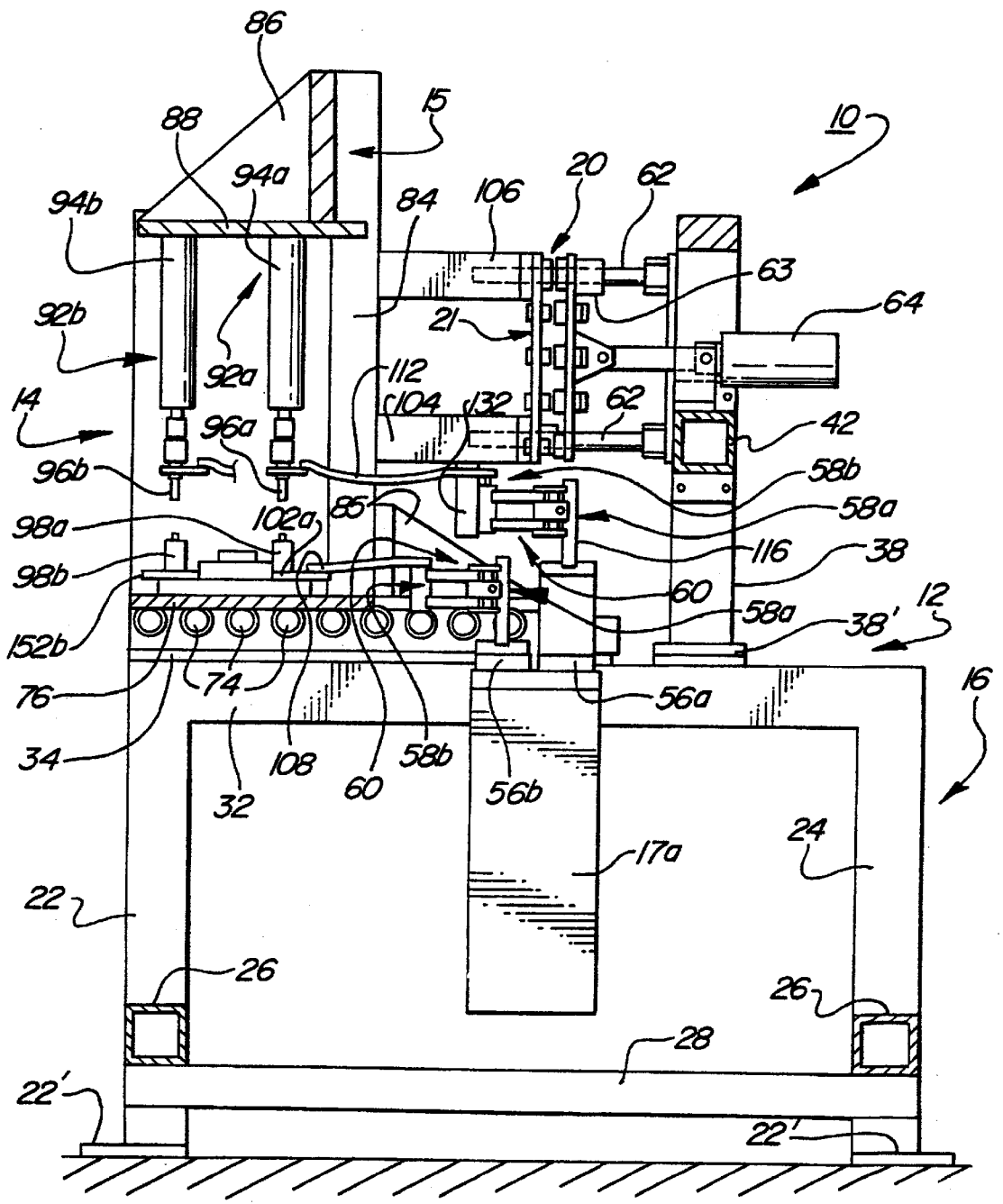
FIG. 2 is a side elevation view of first embodiment of the welding machine of this invention.

FIG. 2 shows the welding machine 10 with the tooling module 14 installed in the base operating machine 12. The machine frame 16 comprises a table structure including front legs 22 with shoe plates 22', rear legs 24, cross beams 26, front to rear longitudinal beams 28 and upper longitudinal beams 32. A table plate 34 is supported on the upper longitudinal beams 32. A pair of oppositely disposed rear posts 38 extend upwardly from bolt plates 38' mounted on the longitudinal beams 32. A support beam 42 extends transversely of the frame between posts 36.

Figure 4:
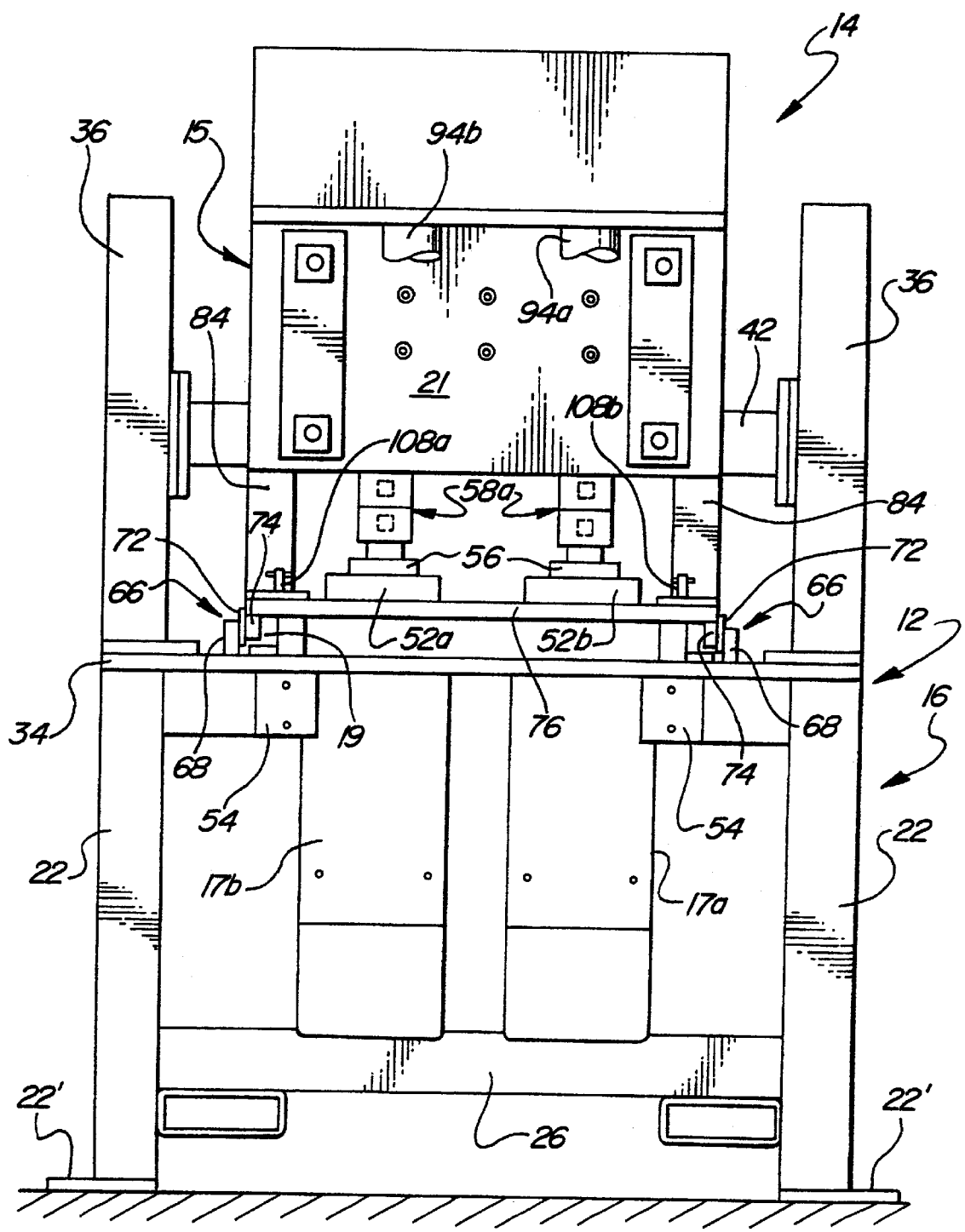
FIG. 4 is a front elevation view of the welding machine with certain parts removed.
Figure 7:
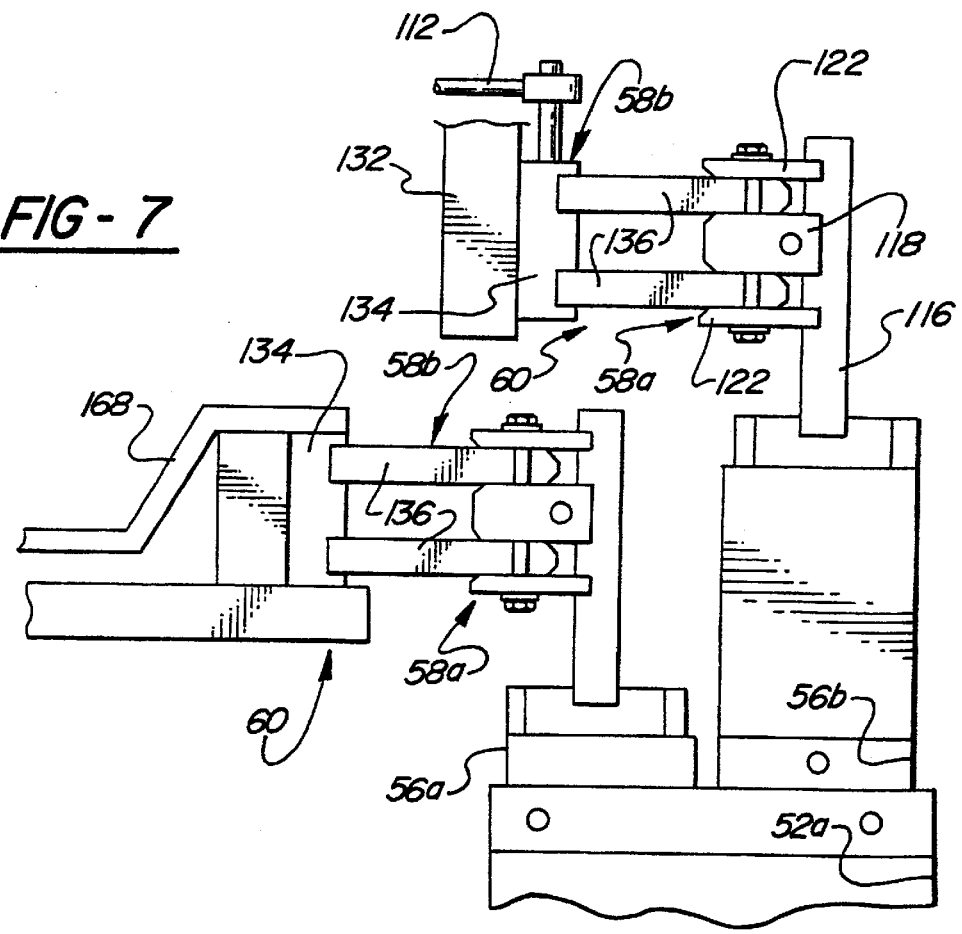

As shown in FIG. 4, the machine frame 16 supports the two welding transformers 17a and 17b. Each transformer is mounted on a frame member by a bracket 54. As shown in FIGS. 2 and 7, each transformer is provided with a pair of secondary terminals 56a and 56b. Each terminal is fitted with a contactor member 58a which is adapted to mate with a complementary contactor member 58b which taken together, constitute a transformer contactor 60. The contactors 60 will be described in greater detail subsequently.

The machine frame 16, as described with reference to FIG. 1 supports a control cabinet 18. The control cabinet includes a controller for the welding machine, preferably a programmable logic controller (PLC). It also contains a weld controller and the power circuits for the welding transformers including the input supply voltage which is connected to the transformer primary winding terminals. In addition to the weld controller, the cabinet contains silicon controlled rectifiers (SCR) for control of the welding current. Further, the cabinet contains the operator interface panel, the weld program selector, manual controls, terminal strips and input/output terminals for control signals and sensor signals. Actuators, such as pneumatic and electrical, are mounted on the machine frame at suitable locations as needed. Solenoid valves (not shown) for control of pneumatic actuators and cooling water are suitably mounted on the machine frame separate from the control cabinet and are connected with the factory supply lines.

Description of the Base Operating Machine of the First Embodiment

Figure 3:
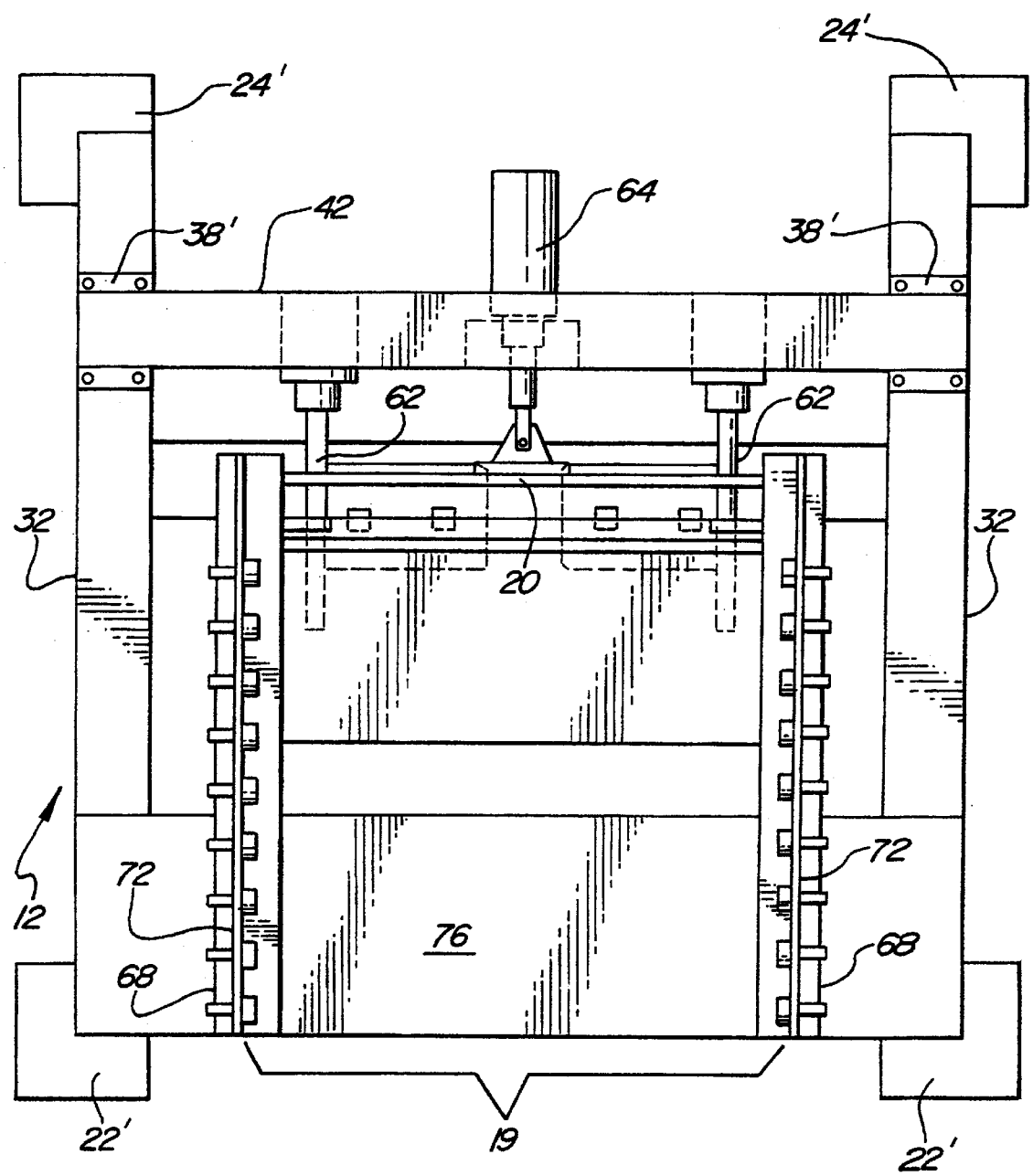
FIG. 3 is a top plan view of the welding machine with certain parts removed.

The base operating machine 12 is shown in side elevation in FIG. 2 with the tooling module 14 installed and it is also shown in FIG. 4 in front elevation with the tooling module 14 installed but with parts broken away. The base operating machine 12 is shown in FIG. 3 in plan view without the tooling module 14 installed. The machine connector plate 20, as shown in FIG. 5, supports a plurality of connectors (to be described below). The connector plate 20 is mounted for horizontal fore and aft movement from a retracted position to an extended position on a set of four guide rods 62 which are fixedly mounted on the support beam 42. In order to maintain alignment of the connector plates 20 and 21 with the module in its installed location, each guide rod 62 extends into a corresponding guide bushing 63 mounted on the module connector plate 21. A pneumatic cylinder 64 is mounted on the support beam 42 and has a piston rod connected with a bracket on the rear of the connector plate 20. The connector plate 20 will be described in greater detail below.

The base operating machine 12 includes a support rack 19 for supporting the tooling module 14 (see FIGS. 2, 3, 4 and 4A). The support rack 19 comprises the table plate 34 and guide means 66. The guide means comprises a pair of rails 68 which extend parallel with each other in the front to rear direction of the machine frame. Each rail 68 includes a flange plate 72 mounted on the inner side of the rail and each rail also includes a plurality of roller bearings 74 having a stationary shaft extending through the flange plate 72 and rail 68 and secured thereto. The rails are spaced apart laterally so that the bottom plate 76 of module 14 (to be described below) is supported on the two sets of rollers and retained in a centered position between the flange plates 72. The rails 68 facilitate the removal and installation of a tooling module in the base operating machine.

Description of the Tooling Module of the First Embodiment

The tooling module 14 is shown installed on the base operating machine 12 in the side elevation view of FIG. 2. It is shown installed on the base operating machine, with parts broken away, in the front elevation view of FIG. 4. The tooling module 14 comprises the module frame 15 which includes the bottom plate 76 with a pair of vertical posts 84 supported thereon in laterally spaced arrangement. Lower triangular brackets 85 support the vertical posts 84 on the bottom plate 76. The posts 84 together with a triangular brackets 86 support a top plate 88 which is located above the bottom plate 76. The upper tooling is mounted to the top plate 88 and comprises the pair of weld guns 92a and 92b which include weld cylinders 94a and 94b and welding electrodes 96a and 96b, respectively. The lower tooling 4 of the module comprises a pair of electrodes 98a and 98b supported in water cooled bases 102a and 102b which are supported on the bottom plate 76.

The tooling module also includes the module connector plate 21 which is supported on the posts 84 by a lower pair of stand-off arms 104 and an upper pair of stand-off arms 106. The module connector plate 21 will be described in greater detail subsequently.

The tooling module 14 also includes the contactor members 58b which are the male contactor members of the transformer contactors 60 and which are movable with the module frame 15. The contactors 60 were referred to above in the description of the machine frame and the welding transformers 17a and 17b. As shown in FIGS. 2 and 6–12, the male contactor members 58b are fixedly mounted to the tooling module frame 15. The contactor member 58b for the lower tooling 4 is mounted to the triangular bracket 85. This contactor member is electrically connected by a rigid bus bar 108 to the base 102a of the lower tooling 4. Similarly, the contactor member 58b for the upper tooling 2 is mounted to the lower stand-off arm 104 of the module frame. This contactor member 58b is electrically connected by a cable 112 to the electrode 96a of welding gun 92a. It will be understood that the electrodes 96b and 98b are electrically connected to their own contactor members (not shown) in the same manner as described for the electrodes 96a and 98a.

As shown in FIGS. 7–12, each contactor 60 is a plug type contactor adapted for quick connect/disconnect by push/pull action. The contactor member 58a constitutes a socket and comprises a support member 116 with a center contact element 118 mounted thereto. It also comprises a pair of outer contact elements 122 which are constructed as flat plates and are mounted to the support member 116 in spaced parallel relation with the center contact element 118. Each of the outer contact elements 122 forms a channel-shaped space between itself and the center contact element 118. The two outer contact elements 122 are urged toward the contact element 118 by a set of three bolts 124 and nuts 126 (see FIGS. 8 and 9) extending through the side contact elements 112 and the center contact element 118. A belleville washer 128 is disposed under the head 132 of each bolt 124 and another belleville washer 128 is disposed under each nut 126 to provide a spring loading of the outer contact elements 122. Each of the channel-shaped sockets 123a and 123b is adapted to receive a contact blade 136 of the plug contactor member 58b which will be described presently. The socket contact elements 118 and 122 as well as the support member 116 are preferably constructed of copper. The bolts 124 with associated nuts and washers constrain the outer contact elements 122 from moving away from the center contact element 118. The inner edges of the contact elements are beveled or suitably rounded to facilitate the entrance of the plug contact elements into the sockets.

Figure 10:
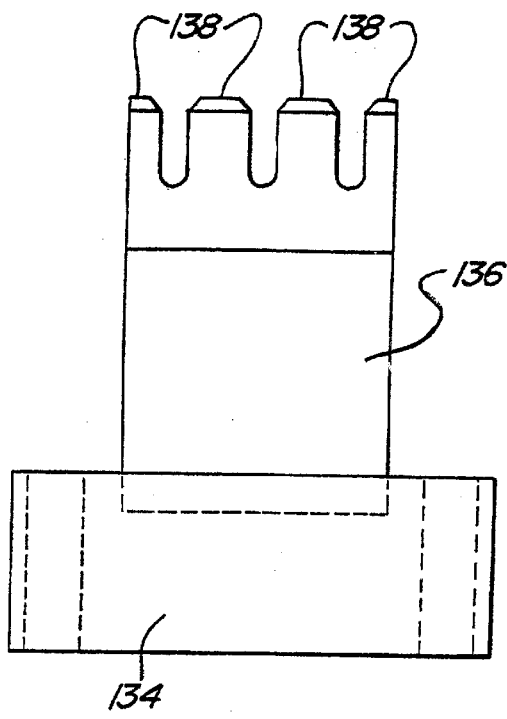
Figure 11:
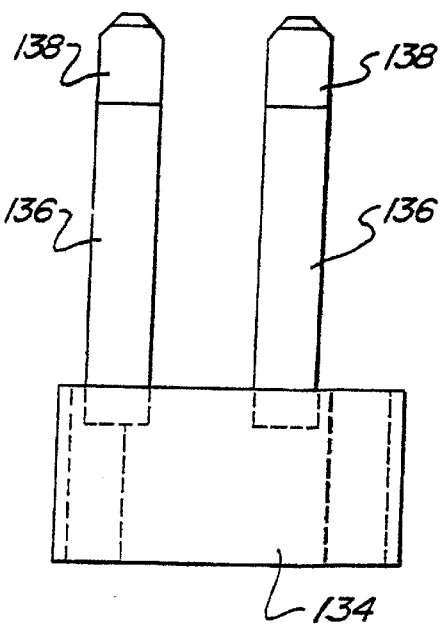
Figure 12:
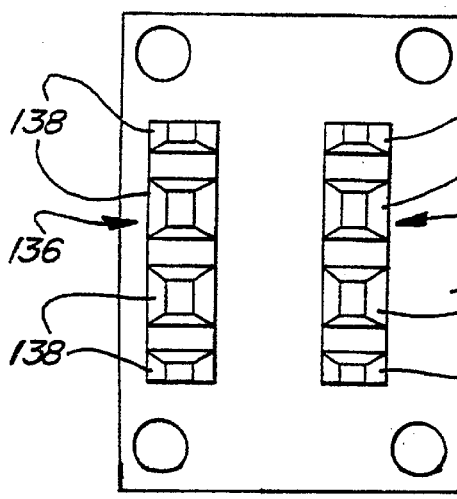

The plug contactor member 58b, as shown on FIGS. 7, 10, 11 and 12, is mounted to an insulating support member 132 which in turn is mounted to the lower stand-off arm 104 of the module frame. A contactor body 134 is mounted to the support member 132 and a pair of contactor blades 136 are mounted to the body 134. Each contactor blade 136 is of rectangular cross-section with oppositely disposed parallel flat faces as best shown in FIGS. 10 and 11. The free ends of the contactor blades are provided with a set of three notches which provides a set of four contact fingers 138 which are spaced apart so as to accommodate the shanks of the three bolts in the socket contactor member 58a. The free ends of the contact fingers 138 are beveled or suitably rounded to facilitate entry into the sockets.

The plug contactor member 58b, being mounted on the module frame, is movable relative to the stationary socket contact member 58a and is disposed in alignment therewith so that linear motion of the tooling module causes insertion or withdrawal of the contactor blades 136 with respect to the contactor sockets 123a and 123b.

The welding current contactors 60, as described above, operate as plug type contactors which make an electrical connection when plugged in and break the electrical connection when unplugged. The contactors are plugged in by the movement of the tooling module 14 from the uninstalled location to the installed location relative to the base operating machine 12. In order for the contactors 60 to be capable of carrying high amperage welding current as required for spot welding, the contactors 60 are provided with contact members which have relatively large area surface-to-surface engagement with a high contact pressure between the surfaces. In the embodiment described above, high contact pressure is provided by the plug and socket arrangement by a close fit of the movable contact member with the fixed contact member together with the belleville washers which serve as force applying means for providing increased contact pressure.

Additionally, the relative motion of the movable and fixed contact members when the contactor is plugged in and unplugged causes a rubbing of the contact surfaces which tends to remove oxide and contamination and provide clean metal-to-metal contact to enhance current conduction.

Figure 17A:
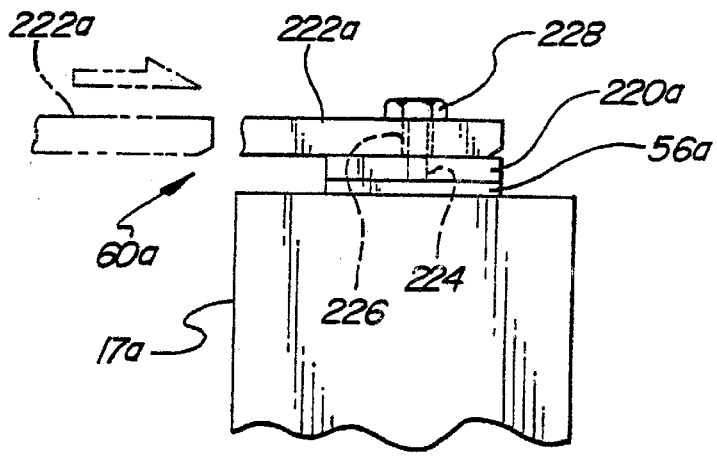
FIGS. 17A, 17B and 17C show alternative electrical contactors which may be used in place of the contactors of FIGS. 7 through 12.

Alternative embodiments of the welding current contactors 60 which are useful in some applications are as follows. FIG. 17A shows a plug type connector 60a with a fixed contactor member 220a and a movable contactor member 222a. The fixed contactor member 220a comprises a copper block mounted on the secondary terminal 56a of the welding transformer 17a. The movable contactor member 222a is a rectangular finger or blade, preferably copper, which is mounted on the frame of the tooling module for movement therewith. The fixed contactor member is provided with a threaded hole 224 and the movable contactor member is provided with a hole 226. When the tooling module is moved into its installed position, as indicated by the phantom arrowhead and contactor member 222a, the movable contactor member 222a is positioned so that the hole 226 is aligned with the threaded hole 224. A bolt 228 is inserted into the holes and is tightened to achieve a high engagement pressure between the contacting surfaces of the contactor members.

Figure 17B:
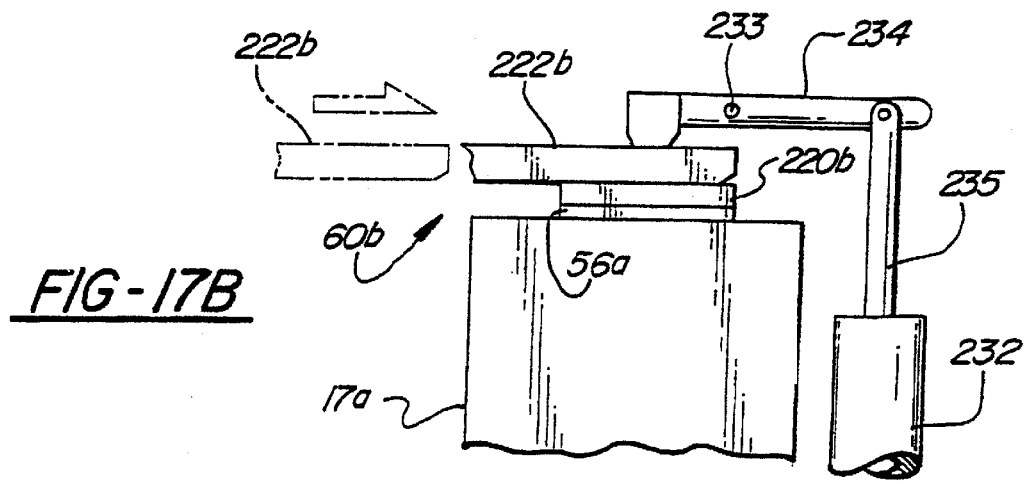

FIG. 17B shows a contactor 60b with a fixed contactor member 220b and a movable contactor member 222b. The movable and fixed contactor members are suitably of the same construction as described with reference to FIG. 17A except that neither member needs to be provided with a hole. A pneumatic actuator 232 is provided to apply a force against the movable contactor member to obtain high engagement pressure between the movable and fixed contactor members. The actuator 232 is mounted on the base operating machine and a pivot arm 234 is supported by a pivot pin 233 on the machine. The pivot arm is connected at one end with the piston rod 235 of the actuator. The other end of the pivot arm, in the open position, is spaced from the fixed contactor member to provide clearance for entry of the movable contactor member. The actuator piston is extended when air pressure is applied and is retracted by a return spring. When the tooling module is moved into its installed location, movable contactor member is positioned between the fixed contactor member and the pivot arm. When the actuator is energized, the arm applies force to obtain the desired contact pressure. The movable contactor member 222b may constitute a rigid bus bar constructed as a unitary bar connected to the lower tooling of the welder.

Figure 17C:
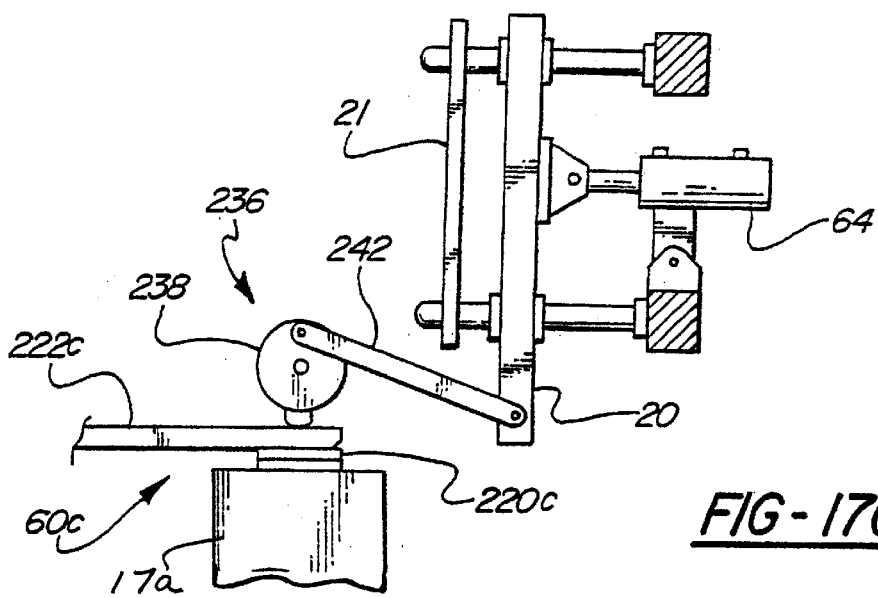
Figure 18:
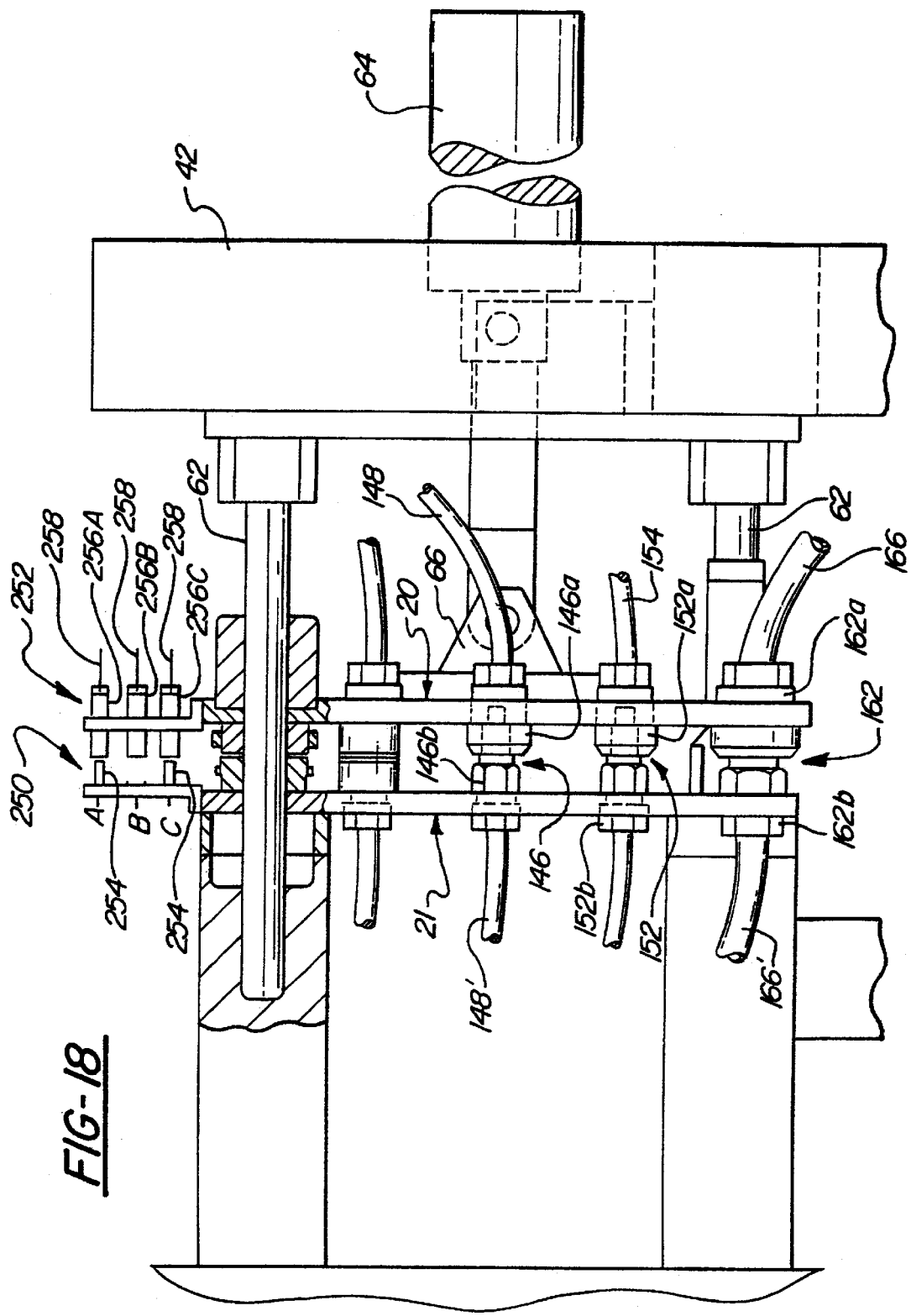
FIG. 18 shows a module coding arrangement for automatic program selection.

FIG. 17C shows a contactor 60c with a fixed contactor member 220c and a movable contactor member 222c. The fixed and movable contactor members are suitably of the same construction as described with reference to FIG. 17B. A cam actuator 236 is provided for applying force to the movable contactor to obtain high contact pressure between the contactor members. The cam actuator includes a cam 238 mounted for rotation about a shaft which is mounted on the frame of the base operating machine. A link 242 is connected between an off-center pivot pin on the cam 238 and a pivot pin on the machine connector plate 20 of the base operating machine. When the tooling module is moved to its installed location, the movable contactor member 222c is positioned over the fixed contactor member 220c. The cam 238 is located above the movable contactor member 222c with clearance from the movable contactor. When the connector plate 20 is actuated by the actuator 64 toward engagement with the module connector plate 21, the cam 238 is rotated and the cam lobe applies a force against the movable contactor to obtain the desired contact pressure.

Description of the Connector Plates of the First Embodiment

The machine connector plate 20 and the module connector plate 21 will now be described with reference to FIGS. 5 and 5A. As described above, the machine connector plate 20 is mounted for linear movement on guide rods 62 between a retracted position and an extended position whereas the module connector plate 21 is stationary with respect to the frame of the tooling module.

FIG. 5 shows the machine connector plate 20 in its extended position with a set of quick connect/disconnect connector members thereon in mating engagement with corresponding connector members on the module connector plate 21. FIG. 5A is a perspective view of module connector plate 21. Each of the connectors is of the type which makes and breaks connection by linear push and pull motion and its male member may be mounted on either connector plate 20 or 21 with its female member mounted on the other plate.

A multi-pin electrical connector 146 has a male connector member 146b mounted on the module connector plate 21 and a female connector member 146a mounted on the machine connector plate 20. An electrical cable 148 extends from the connector member 146a to its associated terminal strip (not shown) in the control cabinet 18. An electrical cable 148' extends from the connector member 146b to associated devices such as sensors on the tooling module. A pneumatic connector 152 includes member 152a on the machine connector plate 20 and a mating connector member 152b on the module connector plate 21. Additional pneumatic connectors 152 of the same structure are provided as shown. An air pressure supply line 154 is connected from the connector member 152a to the associated solenoid valve (not shown) on the machine frame. An air pressure supply line 154' is connected from the connector member 152b to the pneumatic cylinder 94a of the welding gun 92a on the module. A cooling water supply connector 162 includes connector members 162a and 162b. A cooling water supply line 166 extends to an associated solenoid valve (not shown) on the machine frame. A cooling water return line 166' extends to a cooling water connection on the lower tooling of the tooling module. A cooling water return connector (not shown in FIG. 5) is of the same construction as connector 162.

Description of Other Features of the First Embodiment

A parts feeder 172 is shown in FIG. 13 for supplying parts from a parts feed mechanism (not shown) on the base operating machine to the tooling module for welding onto a workpiece. The parts feeder comprises a parts input connector member 172 mounted on the top edge of the machine connector plate 20 and a parts output connector member 174 mounted on the top edge of the module connector plate 21 in alignment with the connector member 172. The input connector member 172 includes a movable shuttle 176 which has feeder tubes 178a and 178b connected thereto and connected to the parts feed mechanism for small parts such as threaded nuts. In this arrangement, two nuts are fed through the tubes 178a and 178b side-by-side to the shuttle 176. The shuttle is actuated by a linear pneumatic actuator 182 connected by a pneumatic line (not shown) to a solenoid valve on the machine frame. The parts output member 174 is provided with a first set of conveying tubes 184a and 184b and a second set of conveying tubes 184c and 184d which extend to specific locations on the workpiece for welding. The shuttle 182 is programmed to switch between the first and second set of conveying tubes in accordance with the requirements of to the workpiece being processed.

Figure 4A:
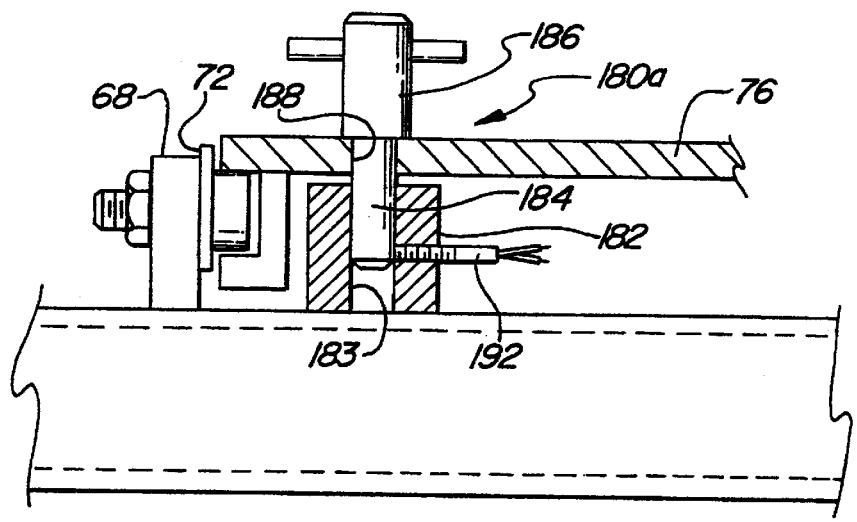
FIG. 4A shows an interlock and sensor for the tool module.

In order to ensure that the tooling module 14 is installed to its proper position a mechanical and electrical interlock system is provided, as shown in FIGS. 4 and 4A. Two interlock units 180a and 180b are provided with one on each side of the support rack 19. The two units are identical and provide both mechanical and electrical interlocking. The description will be given with reference to interlock 180a. The mechanical interlock comprises an index block 182 which is secured to the table plate 34 on the machine frame and has a circular passage which extends vertically through the block from the top surface. A stop pin 184 with a handle 186 extends through an opening 188 in the bottom plate 76 of the tooling module 14. The opening 188 is positioned on the plate 76 so that it is in alignment with the passage 183 in the block 182 when the tooling module is in its installed position in the tooling support rack 19. The electrical interlock comprises a proximity sensor 192 which extends laterally through the index block 182 to a position adjacent the free end of the pin 184 when the pin is fully inserted into the passage 183. The sensor 192 is electrically connected through its associated connector member 146b in the module connector plate 21 and the connector member 146a on the machine connector plate 20 to the PLC in the control cabinet. When the sensor 192 detects the presence of the lock pin 184 in the locking position, an enabling signal is generated which allows operation of the welder to commence.

Figure 16:
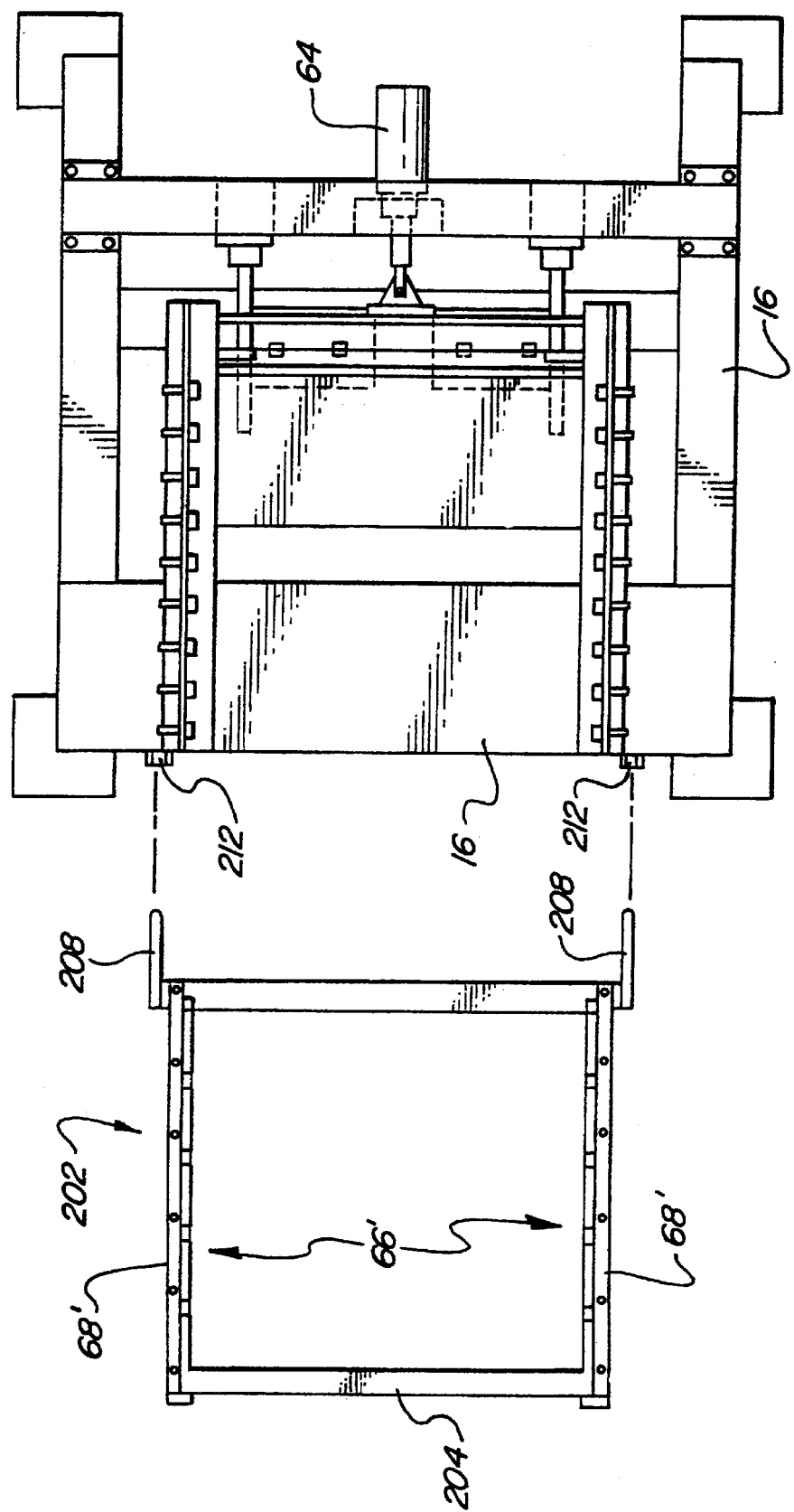
FIG. 16 is a top plan view of the module cart of FIG. 15.

In order to facilitate the installation and removal of the tooling module 14 from the base operating machine 12, a module transfer cart 202 is provided as shown in FIGS. 15 and 16. The cart comprises a rectangular frame 204 which is mounted on a set of casters 206. For supporting the tooling module on the cart, a guide means 66' which comprises rails 68', side plates and roller bearings 74' mounted on the top of the frame 204 in the same manner as described with reference to the guide means 66 in the support rack 19. The forward end of the cart 202 is provided with a pair of alignment pins 208 which extend forwardly from the front of the cart frame 204. A pair of alignment sockets 212 are disposed on the machine frame 16 which are aligned for coaction with the pins 208 when the cart is positioned so that the guide rails 68' on the cart are in alignment with the guide rails 68 on the support rack 19. When the cart 202 is positioned so that the pins 208 are fully inserted into the sockets 212, the tooling module 14 is manually pushed off the cart onto the support rack on the base operating machine to the installed position. In this location, each of the male weld current contactor members 58b are fully inserted into the female contactor members 58a.

Since each tooling module operates under program control provided by the programmable logic controller (PLC), a stored computer program is provided in the PLC corresponding to each different tooling module. When a module is installed in the base operating machine, the program for running the module may be manually selected by the operator by the program selector in the control cabinet. However, in order to avoid the possibility of human error and to provide automatic program selection, it is desirable to make each tooling module a "smart" module. This feature of the invention will now be described.

Figure 19:
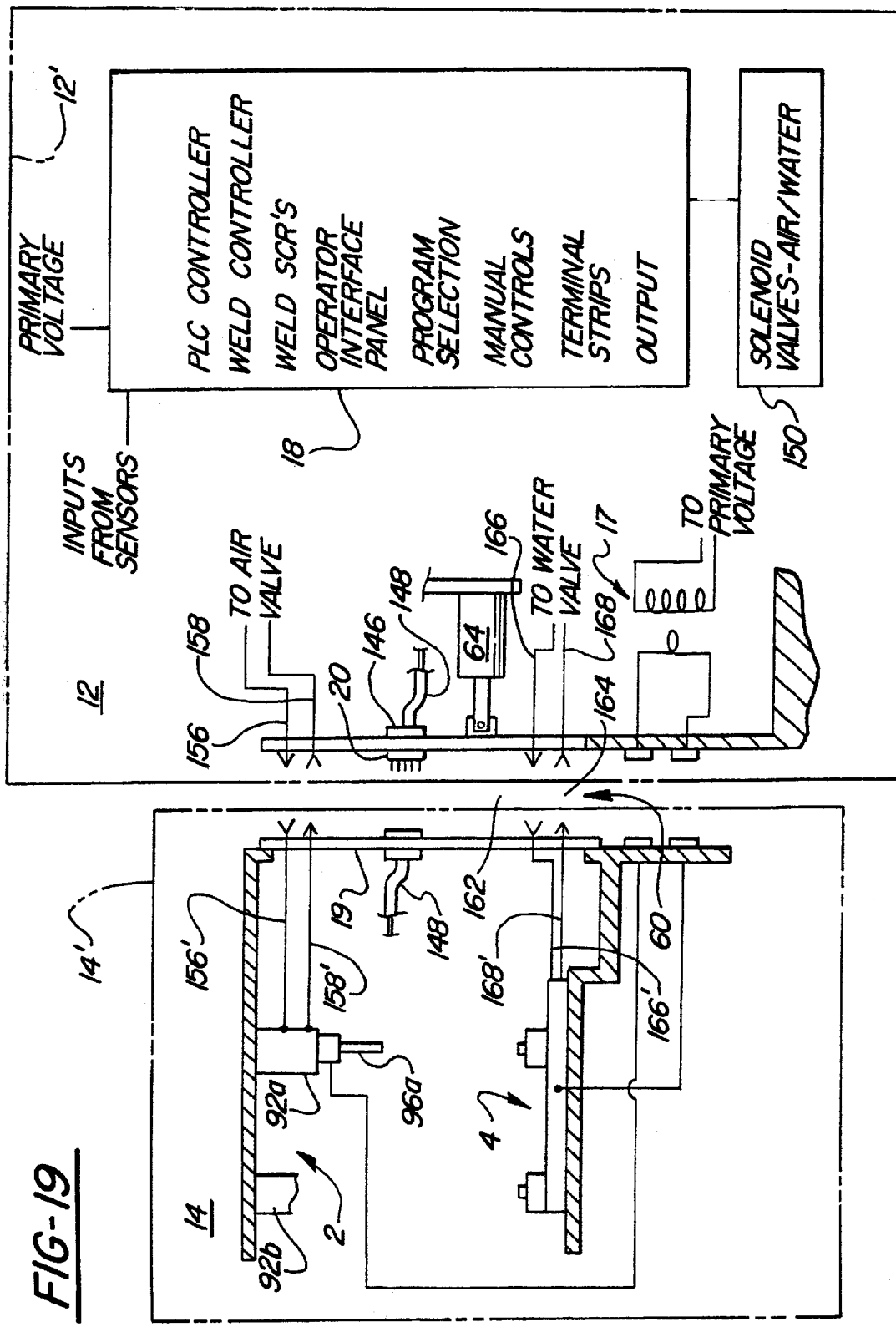
FIG. 19 is a schematic of the electrical and fluid circuits of the welding machine.

As shown in FIG. 19, a code storage device 250 is mounted on the module connector plate 21 and a code reader 252 is mounted on the machine connector plate 20 opposite the code storage device. The code storage device is adapted to store a binary coded number which uniquely identifies the tooling module on which it is mounted and it also identifies a computer program stored in the memory of the programmable logic controller in the control cabinet 18. The stored computer program corresponding to the installed tooling module is designed to control the operation of the welding machine for running a particular production job. It will be understood that there are a plurality of tooling modules 14 for each base operating machine 12 and, as described above, each tooling module is useful for a particular production job. Accordingly, the memory of the programmable logic controller stores a plurality of computer programs, for example, one program for each different tooling module.

The code storage device 250 in the illustrative embodiment comprises three binary element positions a, b and c which may or may not be occupied by a binary element 254. As shown, there is a binary element 254 in positions a and c and an absence of binary element in position b. Thus, the code storage device can be used to represent any one of the digital numbers 0 through 7. The binary elements 254 are of rod-like structure and may be of ferrous metal. The code reader 252 comprises a set of three proximity sensors 256a, 256b and 256c which are disposed opposite the positions a, b and c, respectively, of the code storage device 250. Each of the proximity detectors is a switch which is turned on when the end of the detector is in close proximity to a binary element and is turned off in the absence of such proximity. A conductor 258 is connected between each proximity sensor and an input pin of the programmable logic controller. The controller reads the code number of the installed tooling module 14 and calls up the corresponding computer program to provide program control of the welding machine with the installed tooling module. When it is desired to run a different production job, the installed module is removed from the base operating machine and a different module is installed. Upon installation of the replacement tooling module, the code reader 252 will read the code storage device 250 and the code number thereof will be sensed by the programmable logic controller. The controller will call up the corresponding computer program for running the newly installed tooling module.

Schematic Diagram of the First Embodiment of the Welding Machine

FIG. 19 shows the welding machine of this invention in a schematic diagram. The base operating machine 12 is represented within the dashed line rectangle 12' and the tooling module 14 is represented within the dashed line rectangle 14'. In the interest of clarity, the connections for only a single welding gun are shown in the diagram. The respective frames of the base operating machine and the tooling module are shown as cross-hatched members, it being understood that the frame of the module is separate from the base operating machine, as described above.

The base operating machine as previously described comprises the control cabinet 18 and a set of solenoid valves 150 for on/off control of the pneumatic pressure for actuators and cooling water supply for the welder. The base operating machine also includes a welding transformer 17 for each welding gun of the tooling modules which are to be used with the base operating machine. The base operating machine also includes the machine connector plate 20 which is movable relative to the frame of the base operating machine, by means of the pneumatic cylinder 64, between the retracted position shown and the extended position.

The tooling module 14 is illustrated in FIG. 19 as being in the installed position with reference to the base operating machine 12. In this installed position, the lower and upper contactors 60 are both operatively engaged for connecting the secondary terminals of the transformer 17 with the lower and upper tooling, respectively. When the tooling module is in the installed position, the connector plate 19 of the module is disposed opposite the connector plate 20 of the machine, however, the connector members carried by the respective plates are not operatively engaged with each other until the connector plate 20 is moved from the retracted position to the extended position. This is obtained by energizing the pneumatic cylinder 64 through its solenoid valve. With the connectors in the engaged position, the interlock sensor 192 is connected through mating pins of the electrical connector 146 with the PLC in the control cabinet and the machine is enabled for operation. Other sensor signals and control signals may be sent through other pins of this connector, as desired. The pneumatic connectors 152 and 154 are also operatively engaged and are effective to supply air pressure through the lines 156 and 158 from respective solenoid valves and through lines 156' and 158' to the actuator of the welding gun 98a. The cooling water connectors 162 and 164 are also operatively engaged for supplying cooling water through supply and return lines 166 and 168 to the respective solenoid valves and through lines 166' and 168' to the lower tooling 4 of the module. With the modular connector plate 19 operatively connected with the machine connector plate 20, the welding machine is in readiness for welding operations.

Second Embodiment—General Description

A second embodiment of a modular welding machine according to this invention will be described with reference to FIGS. 20, 21 and 22 and with reference to the description of the first embodiment. The welding machine 10' of this embodiment is an electric arc welding machine of the metal-inert gas (MIG) type and, as such, it is provided with an electric power supply for welding current supplied through a welding current circuit path as conventionally used with arc welders. In this respect, of course, this second embodiment differs from the first embodiment. Further, the MIG welder of this second embodiment differs from the first embodiment in regard to the electric contactor arrangement for supplying weld current from the base operating machine to the tooling module. However, the same underlying principles of construction and use, according to the invention, are applicable to both the first and second embodiments. In the description of the second embodiment, the parts of the welding machine will be designated by reference numbers that are the same as those used to designate corresponding parts in the first embodiment, except that a prime symbol is added to the reference number for the part in the second embodiment.

As shown in FIGS. 20–23, the MIG welding machine 10' comprises, in general, a base operating machine 12' and a tooling module 14' installed in the base operating machine. The base operating machine comprises, in general, a machine frame 16', a welding current power supply 308, a welding robot 310, a control cabinet (not shown in FIG. 20) and other components which are required for operation of the tooling of the welding machine. The robot 310 comprises a base cabinet 312, a robot tool arm 314 which carries and positions a welding electrode 316 in accordance with a computer control program which is associated with the tooling module 14' and installed in the base operating machine 12'. The base operating machine 12' carries a machine connector plate 20' which is movable between a retracted position and an extended position by a pneumatic actuator 64'. The base operating machine 12' also supports a movable electrical contactor 318 which is linearly actuated between a retracted position and an extended position by a pneumatic actuator 319.

The tooling module 14' carries a module connector plate 21' mounted on the module frame 16' below the bottom plate 76'. The tooling module also carries the fixed electrical contactor member 328 which coacts with the movable contactor member 318. The tooling module 14' comprises a module frame 15' which supports the tooling components required for a particular welding job or product which is to be run on the machine. The tooling module 14' is installed in and removed from the base operating machine 12' as a unit in the same manner as in the first embodiment of the invention. As described with reference to the first embodiment, several different tooling modules may be kept in standby condition which are tooled for different production jobs. The base operating machine 12' and tooling module 14' will be described in greater detail below.

Description of the Base Operating Machine of the Second Embodiment

Figure 20:
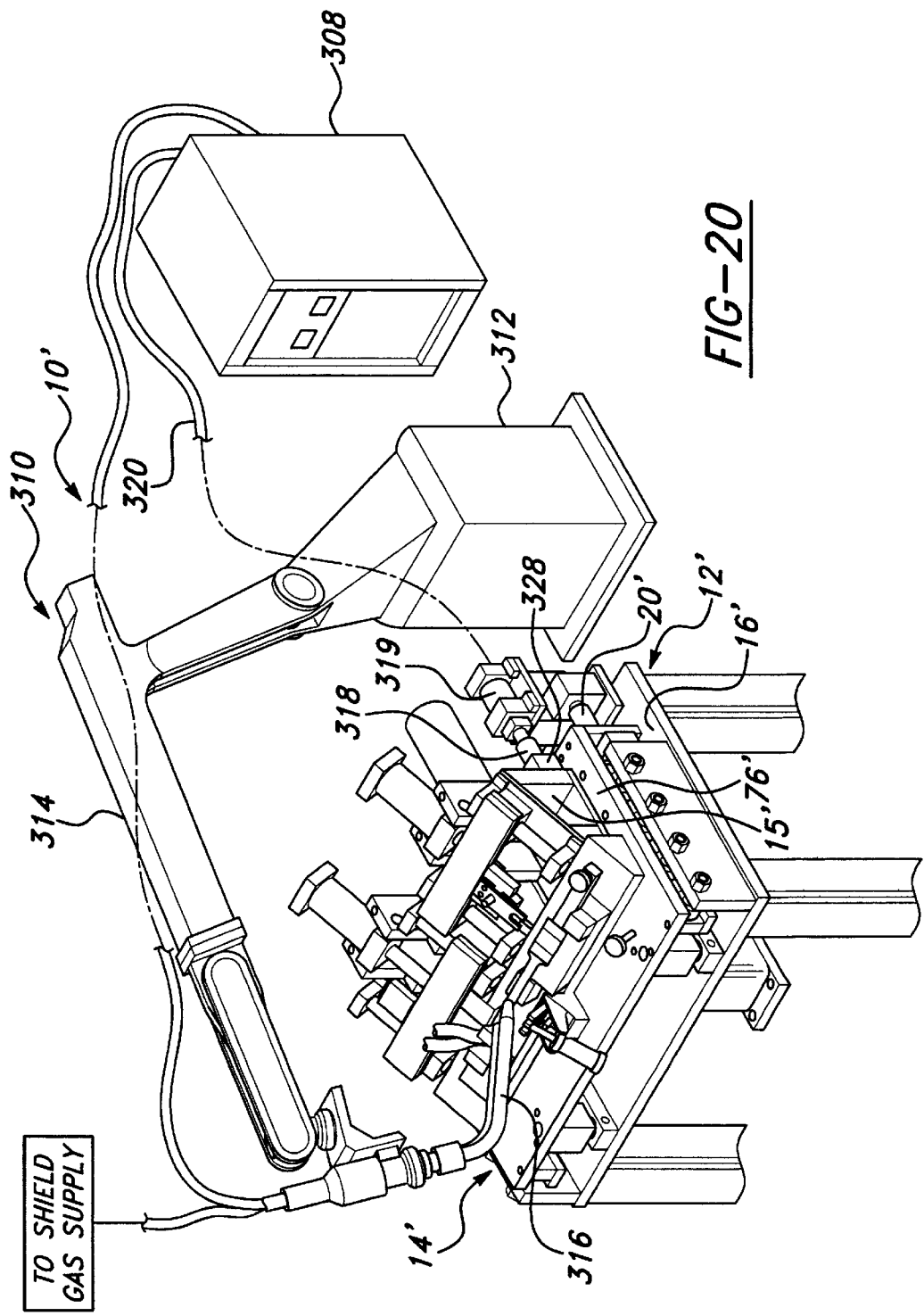
FIG. 20 is a perspective view from a front corner of a second embodiment of the welding machine of this invention.
Figure 21:
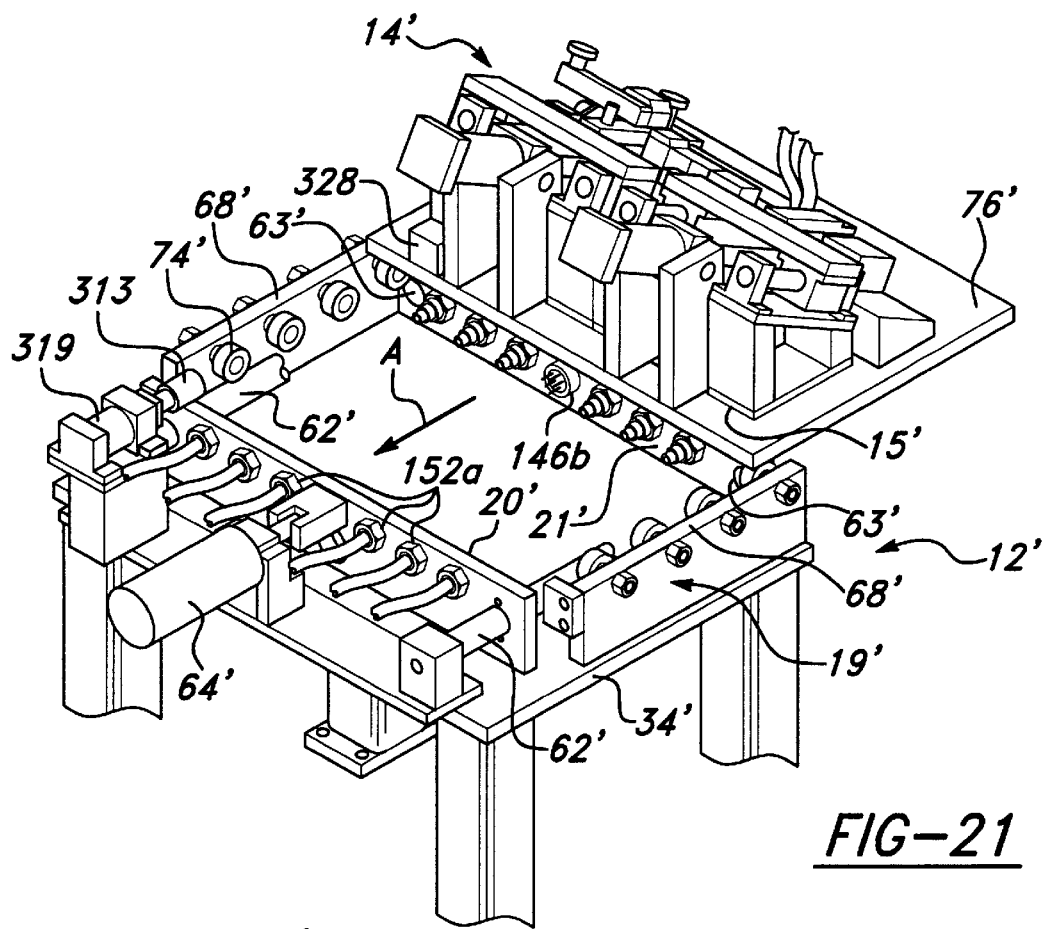
FIG. 21 is a perspective view from the front corner of the base operating machine and a tooling module of this invention.

The base operating machine 12' is shown in FIG. 20 with the tooling module 14' installed; it is also shown in FIG. 21 with the tooling module 14' in an uninstalled position but being moved toward the installed position as indicated by the arrow A. The base operating machine 12' includes the machine connector plate 20' which supports a plurality of connectors which will be described below. The connector plate 20' is mounted for horizontal fore-and-aft movement from a retracted position to an extended position on a set of guide rods 62' which are fixedly mounted on the table plate 34'. In order to maintain alignment of the connector plates 20' and 21' with the module in its installed location, each guide rod 62' extends into a corresponding guide bushing 63' mounted on the module connector plate 21'. The pneumatic actuator cylinder 64' is mounted on the table plate 34' and has a piston rod connected with a bracket on the rear of the connector plate 20'. The connector plate 20' will be described in greater detail below. The base operating machine 12' also includes the movable electrical contactor member 318 which is electrically connected with the negative or ground terminal of the power supply 308 through a flexible cable 320. The contactor member 318 is mounted on the piston rod of a pneumatic actuator 319.

The base operating machine 12' includes a support rack 19' for supporting the tooling module 14'. The support rack 19' comprises the table plate 34' and a guide means 66'. The guide means comprises a pair of rails 68' each of which carries a set of roller bearings 74' for supporting the bottom plate 76' of module 14'. The rails 68' facilitate of the removal and installation of a tooling module in the base operating machine, as described with reference to the first embodiment.

Description of the Tooling Module of the Second Embodiment

Figure 22:
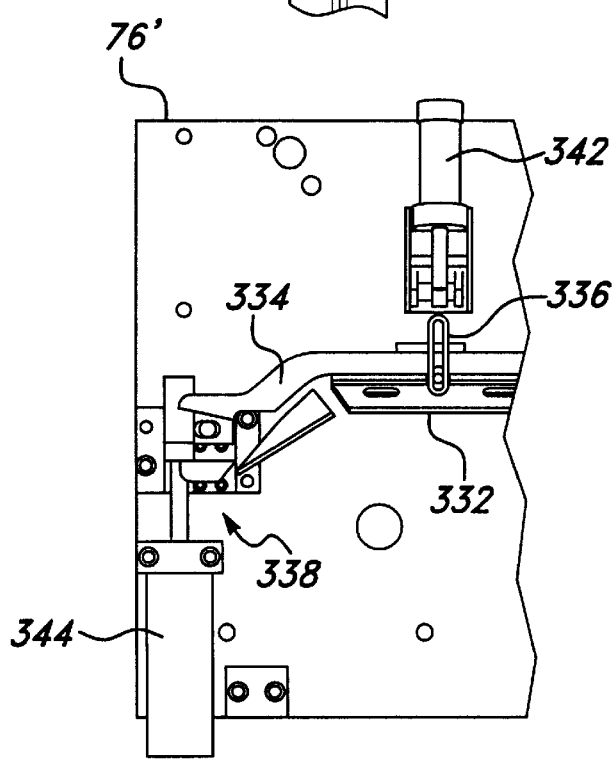
FIG. 22 is a view of a fragmentary section of a tooling module.

The tooling module 14' is shown with the base operating machine 12' in FIGS. 20 and 21 and a fragmentary section is shown in plan view in FIG. 22. The tooling module 14' comprises a bottom plate 76' which constitutes part of the module frame 15'. The fragmentary section shown in FIG. 22 represents an example of tooling in a tooling module. As shown, the bottom plate 76' supports a workpiece holder 332 which is electrically connected with the bottom plate 76'. A first workpiece 334 and a second workpiece 336 are held in a predetermined positional engagement with each other in readiness for welding by a clamping mechanism 338. The clamping mechanism includes pneumatic actuators 342 and 344 which are energized and deenergized under the control of the PLC controller for the particular tooling module. While the workpieces are clamped in position, the welding electrode 316 (see FIG. 20) positioned by the robot 310 performs the welding operation.

The tooling module as shown in FIG. 21 includes the module connector plate 21' which is mounted underneath the bottom plate 76' so that it is aligned with the machine connector plate 20' when the guide rods 62' are mated with the bushings 63' and the module is in the installed location in the base machine. The module connector plate 21' will be described in greater detail subsequently.

The tooling module also includes a fixed contactor member 328 fixedly mounted on the bottom plate 76' in a position such that it is in alignment with the movable contactor member 318 on the base operating machine when the module is in the installed location.

Description of the Connector Plates of the Second Embodiment

The machine connector plate 20' and the module connector plate 21' will now be described with reference to FIG. 21. As described above, the machine connector plate 20' is movable on guide rods 62' in the fore and aft direction by the pneumatic actuator 64'. The connector plate 20' carries a set of female pneumatic connector members 152*a* which are connected through respective hoses to a source of pneumatic pressure. The module connector plate 21' mounted to the module frame 15' is provided with a set of male pneumatic connector members 152*b* which mate respectively with the female connector members 152*a* on connector plate 20'. The module connector plate 21' is also provided with a male electrical connector member 146*b* which is adapted to mate with a corresponding female connector member (not shown) on the machine connector 20' for communicating electrical signals between the base operating machine 12' and the module 14'. The function of the connector plates and the manner of operation is the same as that described with reference to the first embodiment of the invention.

Description of Other Features of the Second Embodiment

The MIG welding machine 10' of this second embodiment of the invention can be provided with other features like those described above with reference to the first embodiment. These additional features include the following:

- module transfer cart as described with reference to FIGS. 15 and 16;
- interlock system as described with reference to FIGS. 4 and 4*a*;
- automatic selection of tooling module computer program as described with reference to FIG. 19; and
- automatic parts feeder as described with reference to FIG. 13.

Schematic Diagram of the Welding Machine of the Second Embodiment

Figure 23:
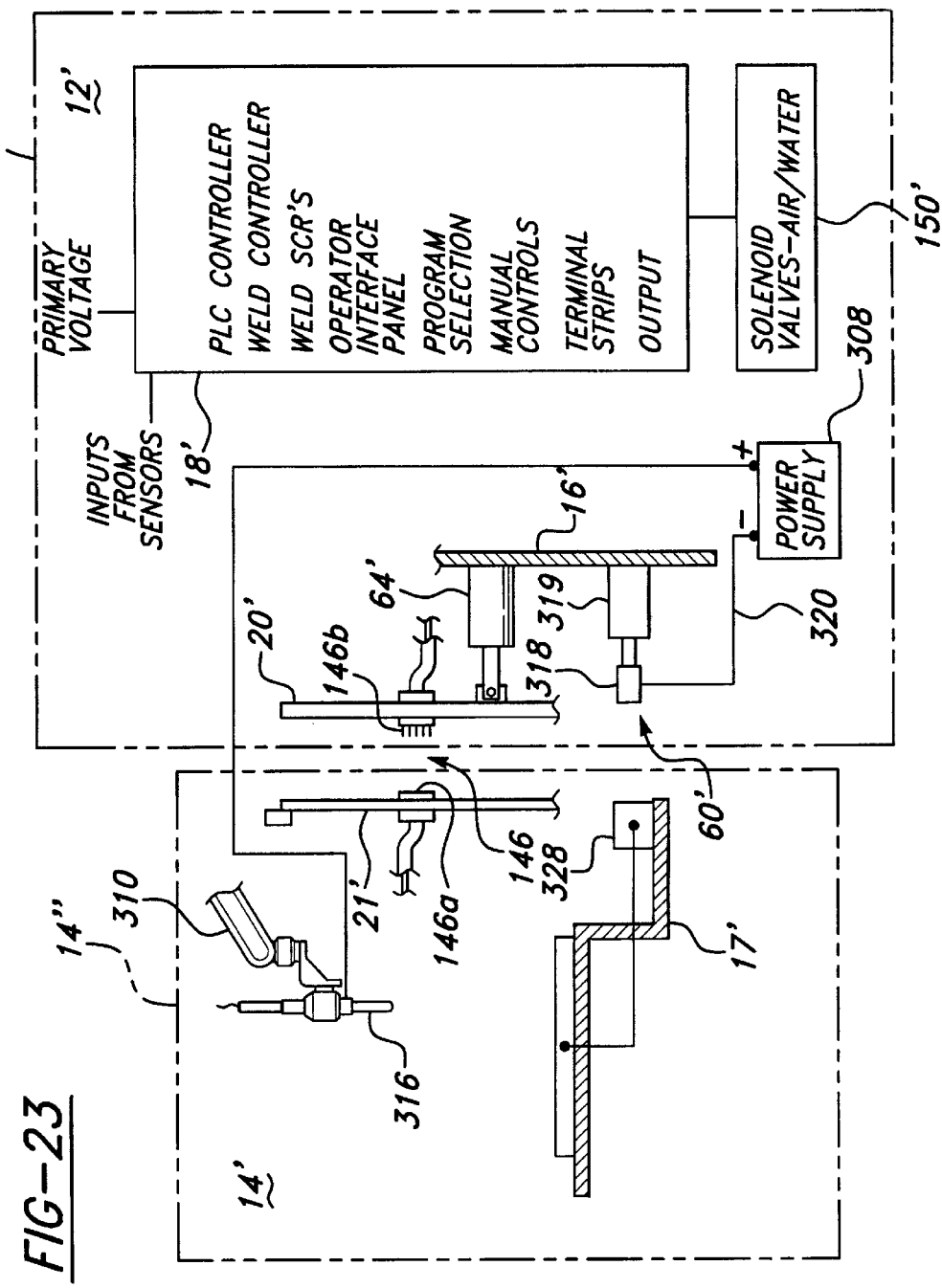
FIG. 23 is a schematic of the electrical and fluid circuits of the second embodiment of the invention.

FIG. 23 shows the welding machine of the second embodiment of the invention in a schematic diagram. The base operating machine 12' is represented within the dashed line rectangle 12" and the tooling module 14' is represented within the dashed line rectangle 14'. The respective frames of the base operating machine and the tooling module are shown as cross-hatched members, it being understood that the frame of the module is separate from the base operating machine, as described above.

The base operating machine as previously described comprises the control cabinet 18' and a set of solenoid valves 150' for on/off control of the pneumatic pressure for actuators. The base operating machine also includes a power supply 308 for supplying welding current to the tooling module. The base operating machine also includes the machine connector plate 20' which is movable relative to the frame of the base operating machine, by means of the pneumatic cylinder 64', between a retracted position, as shown, and an extended position.

The tooling module 14' is illustrated in FIG. 23 as being in the installed location with reference to the base operating machine 12'. In this installed location the movable contactor member 318 is disposed opposite the fixed contactor member 328. However, they are not operatively engaged with each other until the movable contactor member is moved from its retracted position to its extended position. This is obtained by energizing the pneumatic actuator 319 through its solenoid valve. When the contactor members 318 and 328 of the welding current contactor 60' are engaged, the negative terminal of the power supply 308 is connected through the welding current contactor 60' to the bottom plate 76' of the tooling module 14". When the tooling module is in the installed location, the connector plate 21' of the module is disposed opposite the connector plate 20' of the machine; however, the connector members carried by the respective plates are not operatively engaged with each other until the connector plate 20' is moved from the retracted position to the extended position. This is obtained by energizing the pneumatic cylinder 64' through its solenoid valve. With the connectors in the engaged position the system is actuated and energized as in the first embodiment described above. The interlock sensor is connected through mating pins of the electrical connector 146 with the PLC in the control cabinet and the machine is enabled for operation. Other sensor signals and control signals may be sent through other pins of this connector, as desired. The pneumatic connectors 152 are also operatively engaged and are effective to supply air pressure through the lines from respective solenoid valves. With the modular connector plate 21' operatively connected with the machine connector plate 20', the welding machine is in readiness for welding operations.

Additional Alternative Embodiment of Welding Current Contactors

In connection with the first illustrative embodiment of the invention, namely the resistance welding machine 10, several different embodiments of the welding current contactors 60 are described under the sub-heading "Description of the Tooling Module". An additional embodiment of the welding current contactors will now be described for the resistance welding machine 10 with reference to FIGS. 24–28. In this description, the same reference characters will be used for those parts of the machine 10 as those which are used for the same parts in the description given above; however, corresponding but dissimilar parts of the welding current contactor system of this additional embodiment will be designated by the same reference characters with a prime symbol added or by additional reference characters different from those used above.

Figure 24:
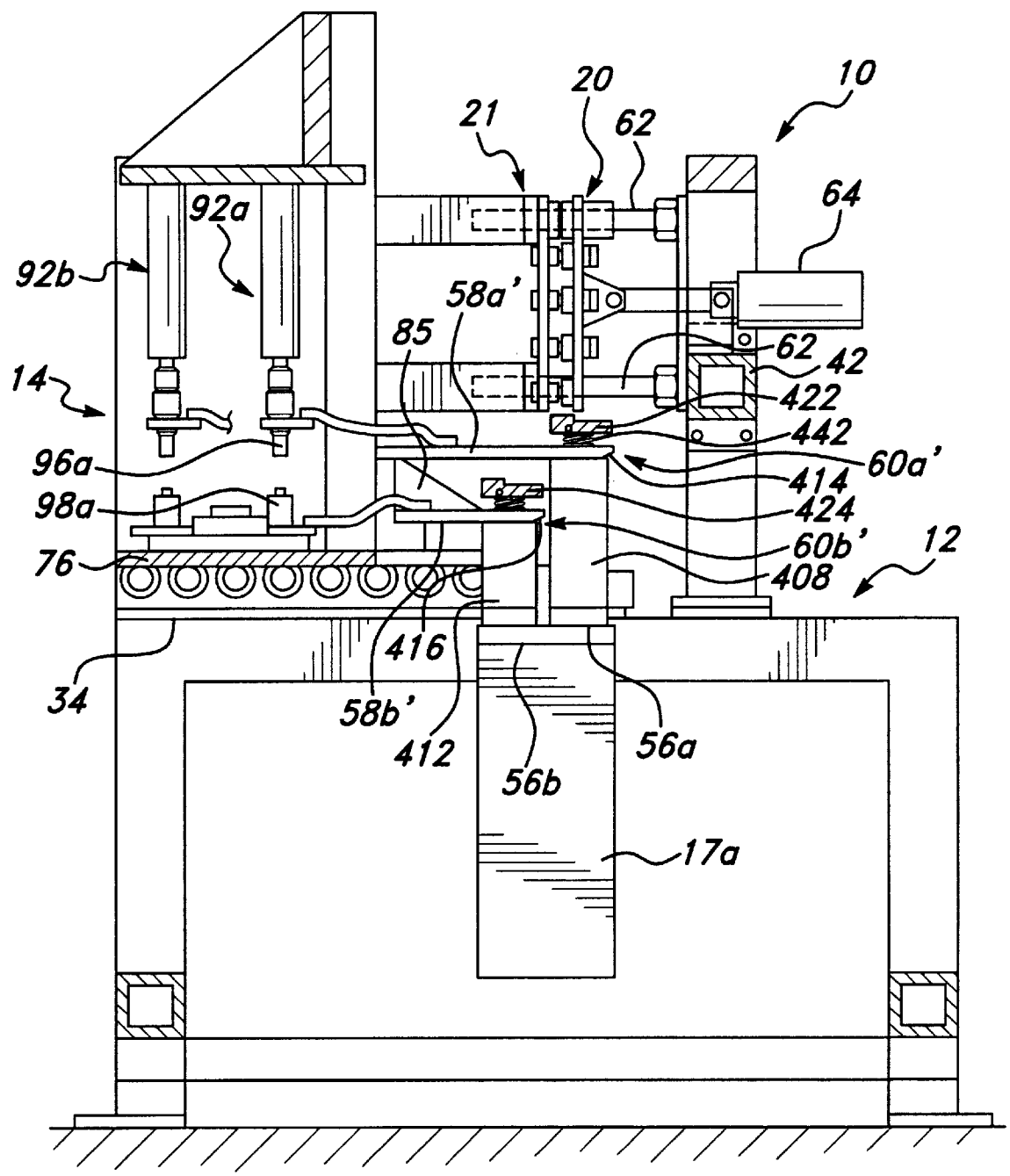
FIG. 24 is a side elevarion of an additional embodiment of a welding current contactor.

The welding machine 10 as shown in FIG. 24 is the same as that described above with reference to FIGS. 1–16, 18 and 19 except for this additional embodiment of the welding current contactor system. For the purpose of the simplified illustration, FIG. 24 depicts only a portion of the welding current contactor system, namely the contactors, per se, for a single transformer and only part of the power actuator for the movable contactor members. FIGS. 25 through 28 show the complete welding current contactor system for a welding machine 10 having three. transformers and a ganged power actuator system for actuating three sets of contactors (one set of two for each transformer).

Referring now to FIG. 24, the base operating machine 12 is shown in side elevation with the tooling module 14 in its installed location on the base operating machine. The machine connector plate 20 is shown in its extended position so that the connector members thereon are engaged with the connector members on the tooling module connector plate 21. The base operating machine 12 and the tooling module 14 are fully described above with reference to FIGS. 2, 3, 4, 5, 6, 15, 16, 18, and 19.

In FIG. 24, the welding transformer 17a on the base operating machine 12 is electrically connected with the tooling module 14 for supply of welding current to the welding gun 92a for welding a workpiece (not shown) which is positioned between the welding electrodes 96a and 98a. For this purpose, the tooling module 14 includes a first contactor 60a' for connecting the ungrounded terminal 56a of the transformer to the welding electrode 96a and it also includes a second contactor 60b' which connects the grounded transformer terminal 56b to the electrode 98a. The transformer terminal 56a is provided with an adapter or riser block 408 which is connected with the terminal by threaded fasteners (not shown). The terminal 56a and block 408 are suitably made of copper and, taken together, constitute a contactor member of the first contactor 60a'. Similarly, the transformer 56b is provided with a riser block 412 which is connected by threaded fasteners (not shown) to terminal 56b. Terminal 56b and the block 412 are suitably made of copper and, constitute a contact member of the second contactor 60b'. It will be understood that the riser blocks 408 and 412 are used, as needed, in order to locate the electrical contactor surfaces thereof at a level above the transformer 17a so that they lie in a horizontal plane which is the same or slightly above the horizontal plane of the electrical contactor surfaces of the contactor members 58a' and 58b', respectively. The transformer 17a, being a conventional transformer, is provided with terminals 56a and 56b of the same height and the height of the riser blocks is selected in accordance with the location of the movable contactor members 58a' and 58b' in the particular machine. Thus, in some installations, may be that one or both of the riser blocks may be dispensed with; terminals itself constitutes the fixed contactor member.

As shown in FIG. 24, a first movable contactor 58a' has one end mounted to the triangular bracket 85 in cantilever fashion by fasteners (not shown). The movable contactor 58a' is an elongated rectangular copper bar having a free end which has a flat lower surface which overlays the flat upper surface of the riser block 408 when the tooling module is in its installed location. The free end of the contactor 58a' has a chamfered lower edge 414. The contactor 58b' is of the same construction as the movable contactor 58a' and overlays the flat upper surface of the riser block 412 when the tooling module is in the installed position. The free end of the movable contactor 58b' has a chamfered lower edge 416. The reason for the chamfers 414 and 416 on the free ends of the movable contactor members 56a' and 56b', respectively is to provide a camming surface for engagement with the upper ends of the contactor members which allows the movable contactor members to slide over the upper surfaces of the fixed contactor members.

As shown in FIG. 24, a clamp jaw 422 is disposed above the movable contactor member 58a' for clamping the its free end against the upper end of the riser block 408. Similarly, the clamp jaw 424 is disposed above the movable contactor member 58b' for clamping its free end against the upper end of the riser block 412. Clamping 408 and 412 will be described in detail below. A contactor clamping system, including clamp jaws 422 and 424, for clamping the movable contactors 58a' and 58b' against the respective fixed contactors, i.e. riser block 408 and 412 will be described with reference to FIGS. 25–29.

Figure 25:
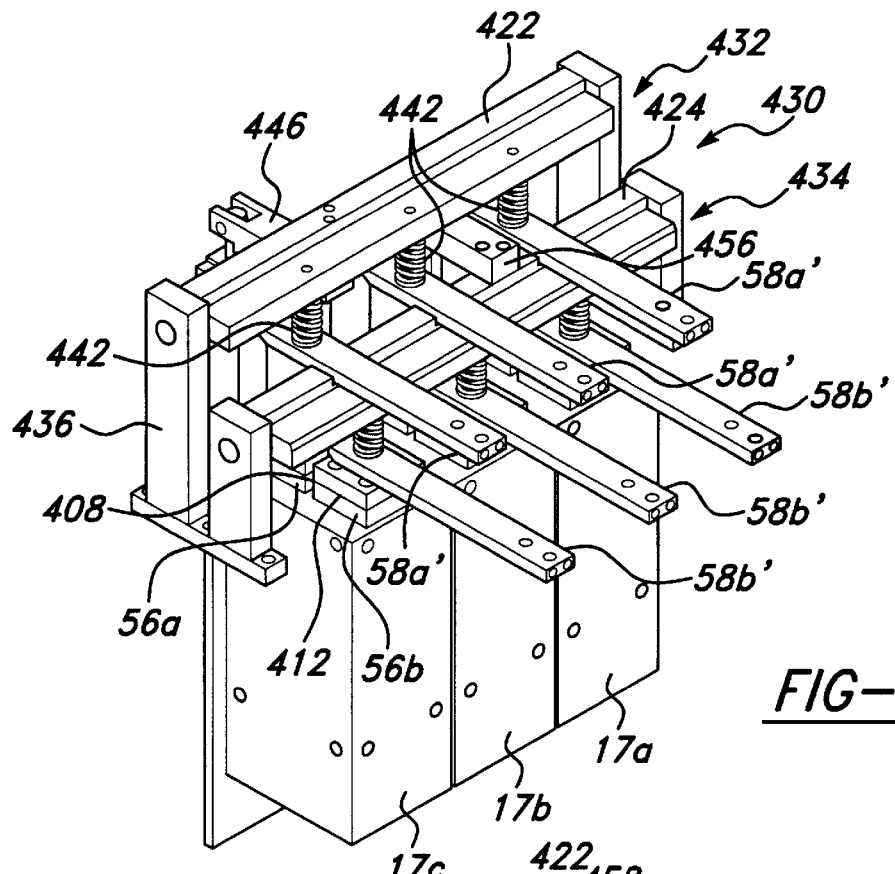
FIG. 25 is a perspective view of a contactor clamping system.
Figure 26:
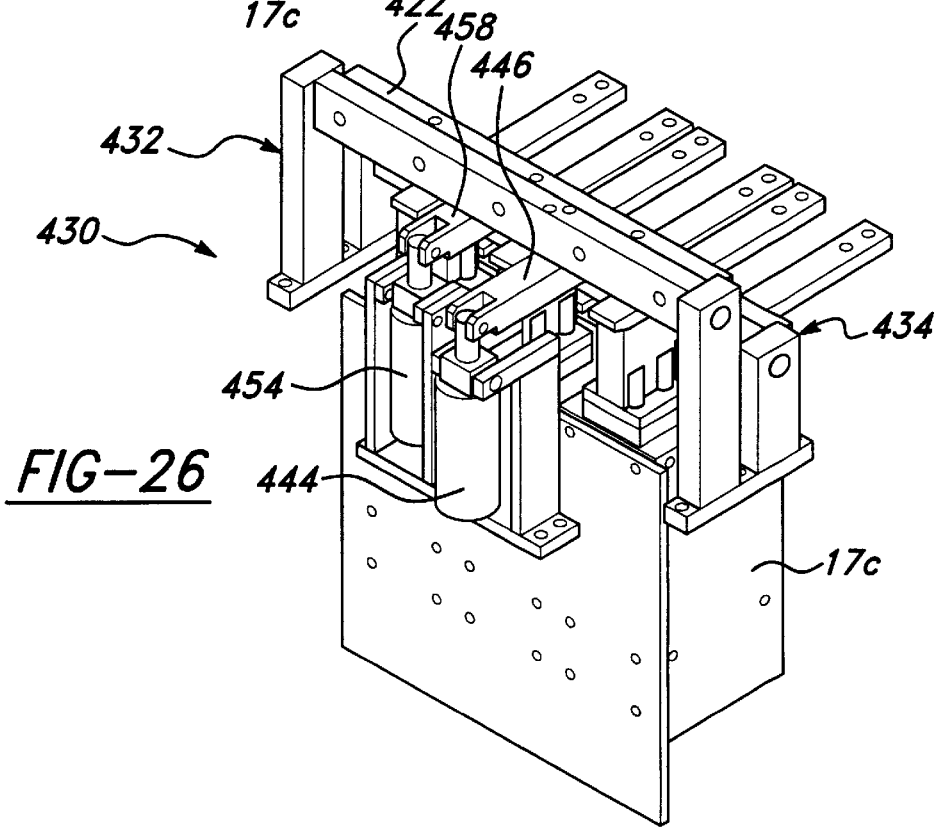
FIG. 26 is a rear view of the clamping system of FIG. 25.
Figure 27:
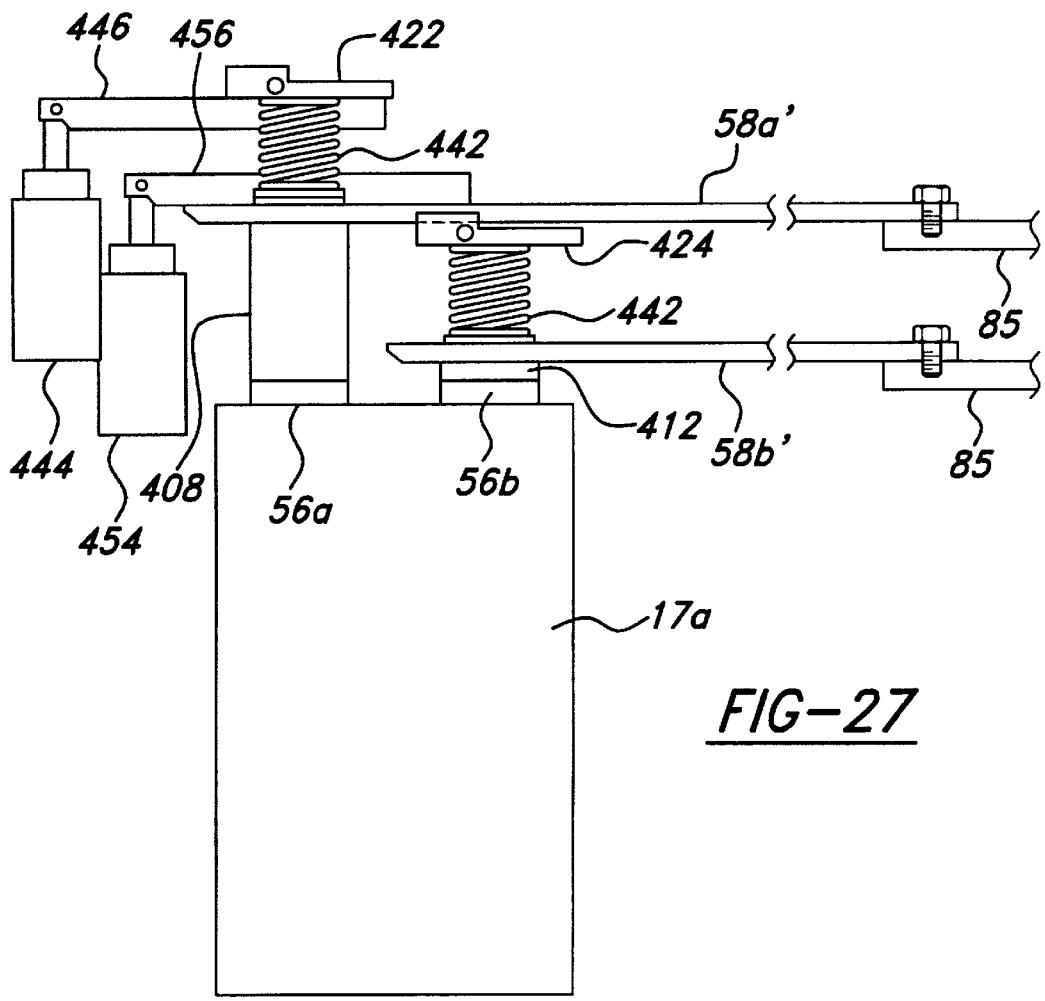
FIG. 27 is a side view of the contactor clamping system of FIG. 26.

FIG. 25 is a perspective view of a contactor clamping system 430 of a ganged set of transformer contactors for a set of three welding transformers 17a, 17b and 17c. The contactor clamping system 430 is a part of the base operating machine 12 and FIG. 25 is a front view of the clamping system 430. FIG. 26 is a rear view of the clamping system 430. It is noted that a set of movable contactors 58a' and 58b' is shown for each of the three different transformers 17a, 17b and 17c. All three sets of movable contactors 58a' and 58b' are mounted on the tooling module 14 as described with reference to FIG. 24. Each transformer and its set of contactor members 58a' and 58b' supply welding current to different sets of electrodes on the tooling module. Each of the transformers 17a, 17b and 17c has a set of secondary terminals 56a and 56b and a set of riser blocks 412 and 408 as described with reference to FIG. 24. As previously described with reference to FIG. 24, the movable contactor members 58a' and 58b' corresponding of each transformer are engaged with respective fixed contactor members (blocks) 408 and 412 when the tooling module is in its installed location in the base operating machine. Thus, the contactors 60a' and 60b' of each transformer is closed and operatively connects transformers to the corresponding welding electrodes. Because of the high amperage to be conducted through each contactor it is preferable to clamp the contactor members into tight engagement and thereby reduce the electrical contact resistance. The contactor clamping system 430 is adapted to apply a clamping force simultaneously to each of the three sets of contactors for supplying welding current through the three sets of welding electrodes in the tooling module.

The contactor clamping system 430 comprises an upper clamping mechanism 432 and a lower clamping mechanism 434. The upper clamping mechanism 432 is operative when actuated to clamp the movable contactor members 58a against the riser blocks 408. The upper clamping mechanism 432 comprises a clamp support frame 436 which is mounted on the frame of the base operating machine. A clamp jaw 422 is pivotally mounted on the support frame 436 and carries a set of three clamp springs 442 each of which transmits clamping force from the clamp jaw 422 to one of the movable contactor members 58a'. A wear plate (not shown) is attached to each movable contactor for engagement by the spring to avoid scuffing and wear of copper contactor bar. On the contactors 58b', an insulator plate (not shown) is disposed between the wear plate and the movable contactor bar to isolate the clamping system 430 from the transformer high voltage. The clamp jaw 422 is actuated by a pneumatic actuator 444 through a coupling lever 446 which is connected directly to the clamp jaw. The clamp jaw 422 is pivotable between an open position in which no clamping force is applied and a closed position (as shown in FIGS. 25 and 26) in which clamping force is transmitted from the jaw through the spring 442 to the movable contactor member 58a'. When the actuator 444 is deenergized the clamp jaw 438 is open and when it is energized the clamp jaw is closed.

Figure 28:
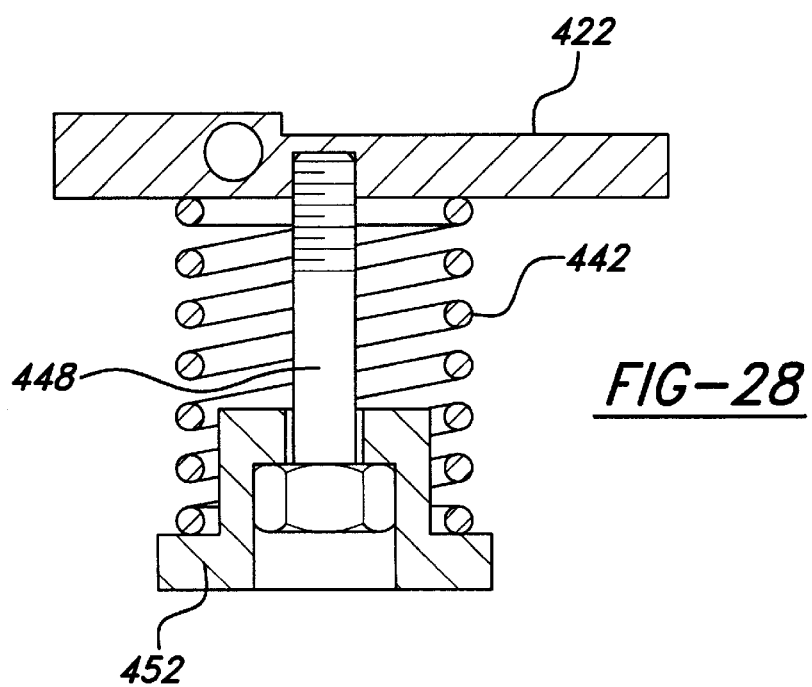
FIG. 28 shows a detail of construction of part of FIG. 27.

The clamp spring 442 as shown in FIG. 28, is mounted on the clamp jaw 422 for movement therewith. The clamp springs 442 transmit clamping force from the clamp jaw 438 to the respective movable contactor members 58a' and compensate for any differences in the height of the fixed contactor members of the different transformers. For this purpose, a bolt 448 is used to secure the spring 442 to the clamp jaw 422 through a cup washer 452. To allow compression of the spring without interference by the bolt head, the bolt head is seated in the cup washer so that the spring can be compressed a sufficient distance to apply desired clamping force without engagement of the bolt head against the contactor member.

The lower clamping mechanism 434 is of the same construction as the upper clamping mechanism as described above except that it is actuated by a pneumatic actuator 454 through a coupling lever 458. The lower clamping mechanism 434 is operative to clamp the movable contactor members 58b' in the same manner as described above in regard to the upper clamp mechanism.

CONCLUSION

Although the description of this invention has been given with reference to particular embodiments, it is not to be construed in a limiting sense. Many variations and modifications will now occur to those skilled in the art. For a definition of the invention, reference is made to the appended claims.

What is claimed is:

1. A welding machine for use with a welding current power supply having a welding electrode connection terminal and a tooling connection terminal, said welding machine comprising:

a machine frame, a tooling module having a module frame and being movable between an un-installed and installed location relative to said machine frame, said tooling module including a workpiece holder for receiving workpieces to be welded, said tooling module including tooling for electric welding and including a module connector plate, a machine connector plate mounted on said machine frame and having a first connector member mounted thereon, said module connector plate having second connector member mounted thereon, an electrical contactor for electrically connecting said tooling to said tooling connection terminal, said contactor having first and second contactor members, said first contactor member being mounted on said tooling module and being electrically connected with said workpiece holder, said second contactor member being mounted on said machine frame and being adapted for electrical connection with said tooling connection terminal of said power supply, a welding electrode adapted for electrical connection with said electrode connection terminal of said power supply and being positioned for welding said workpieces in said workpiece holder, means for connecting said first and second electrical contactor members with each other when said tooling module is in said installed location, guide means for guided movement of said tooling module on said machine frame between said un-installed and installed locations, said module connector plate being located in alignment with said machine connector plate when said tooling module is in said installed location, and a first actuator for moving said machine connector plate toward said module connector plate with said module in said installed location for operative engagement of said first and second connector members.

2. The welding machine as defined in claim 1 including:

a second actuator mounted on said machine frame for moving said second contactor member into contact with said first contactor member.

3. The welding machine as defined in claim 2 wherein said first and second actuators are fluid pressure actuators.

4. The welding machine as defined in claim 1 including:

a first alignment member mounted on said machine connector plate and a second alignment member mounted on said module connector plate, said first and second alignment members coacting with each other when said tooling module is in the installed position to hold said connector plates in predetermined alignment with each other.

5. The welding machine as defined in claim 4 wherein said machine connector plate includes a plurality of first alignment members mounted thereon and said module connector plate includes a plurality of second alignment members mounted thereon, each of said first alignment members being mated with one of said second alignment members when said machine connector plate is moved from said retracted position to said extended position.

6. The welding machine as defined in claim 5 wherein said first alignment members are pins and said second alignment members are bushings.

7. The welding machine as defined in claim 1 wherein:
said machine connector plate is mounted for reciprocal motion on said machine frame,
and said actuator is connected with said machine connector plate for moving said machine connector plate from a retracted position to an extended position when said tooling module is in the installed position for engaging said first and second connector members.

8. The welding machine as defined in claim 7 wherein:
said machine connector plate has a plurality of first connector members mounted thereon and said module connector plate has a plurality of second connector members mounted thereon,
each of said first connector members being adapted to mate with a corresponding one of said second connector members to establish an operative connection therebetween when said machine connector plate is moved from said retracted position to said extended position.

9. The welding machine as defined in claim 8 wherein a selected number of said first and second connector members constitute fluid pressure connectors and a selected number of said first and second connector members constitute electrical connectors.

10. The welding machine as defined in claim 1 wherein said guide means comprises:
a track means on said machine frame and a track follower means on said tooling module frame for moving said module between said un-installed location and said installed locations.

11. The welding machine as defined in claim 1 wherein:
said guide means comprises a pair of spaced apart tracks disposed parallel to each other on said machine frame, and
a set of rollers mounted on each of said tracks for movement of said module between said un-installed location and said installed locations.

12. The welding machine as defined in claim 10 including:
indexing means comprising a first element fixedly mounted on said machine frame and a second element movably mounted on said module frame for engagement of said elements with each other when said module is in said installed location.

13. The welding machine as defined in claim 12 wherein said first element comprises a socket and said second element comprises a pin for receiving said pin.

14. The welding machine as defined in claim 12 including a sensor mounted on said machine frame for detecting the engagement of said elements for providing a signal indicating the location of said module in said installed location.

15. The welding machine as defined in claim 1 including:
a tool cart for transferring said tooling module to said machine frame,
guide means on said tool cart for receiving said tooling module and for moving said module between said guide means on said tool cart and said guide means on said machine frame.

16. A The welding machine as defined in claim 15 including:
a first alignment member on said cart,
a second alignment member on said machine frame,
said first and second alignment members coacting to hold said guide means on said cart in alignment with said guide means on said machine frame.

17. A welding machine for use with a welding current power supply having a welding electrode connection terminal and a tooling connection terminal,
a machine frame,
a tooling module having a module frame and being movable as a unit between an un-installed and installed location relative to said machine frame,
said tooling module including a workpiece holder for receiving workpieces to be welded,
a machine connector plate mounted on said machine frame and having a set of first connector members mounted thereon,
said tooling module including a module connector plate having a set of second connector members mounted thereon,
said machine connector plate having an unplugged position in which said first connector members are not operably connected with said second connector members and having a plugged-in position in which said first connector members are operatively connected with said second connector members,
an electrical contactor for electrically connecting said workpieces holder to said tooling connection terminal, said contactor having first and second contactor members, said first contactor member being mounted on said tooling module and being electrically connected with said workpiece holder, said second contactor member being mounted on said machine frame and being adapted for electrical connection with said tooling connection terminal of said power supply,
a welding electrode adapted for electrical connection with said electrode connection terminal of said power supply and being positioned for welding said workpieces in said workpiece holder,
said machine connector plate being in said unplugged position when said tooling module is in said installed position,
a first actuator connected with said machine connector plate for moving said machine connector plate from said unplugged position to said plugged-position when said tooling module is in the installed location for operatively connecting said first and second connector members,
means for connecting said first and second electrical contactor members with each other when said tooling module is in the installed location,
and guide means for guiding movement of said tooling module on said machine frame between said un-installed and installed locations.

18. A welding machine comprising:
a base operating machine including a machine frame and a welding current power supply having a welding electrode connection terminal and a tooling connection terminal,
a machine connector plate mounted on said machine frame and having a set of first connector members mounted thereon,
a tooling module including tooling for electric welding and including a module connector plate with a set of second connector members mounted thereon,
an electrical contactor for electrically connecting said tooling to said tooling connection terminal, said contactor having first and second contactor members, said first contactor member being mounted on said tooling module and being electrically connected with said tooling, said second contactor member being mounted on said machine frame and being electrically connected with said tooling connection terminal of said power supply, a welding electrode electrically connected with said electrode connection terminal of said power supply and being positioned for welding said workpieces in said workpiece holder, guide means on said machine frame and follower means on said tooling module for moving said tooling module between an uninstalled location relative to said machine frame and an installed location relative to said machine frame, said machine connector plate having an unplugged position in which said first connector members are not operably connected with said second connector members and having a plugged-in position in which said first connector members are operatively connected with said second connector members.

19. The welding machine as defined in claim 18 wherein:

said first and second contactor members are aligned with each other and are moved toward engagement with each other when said tooling module is moved into said installed location.

20. The welding machine as defined in claim 19 including:

force applying means for forcing said contactor members into engagement with each other when said tooling module is in said installed location.

21. The welding machine as defined in claim 20 wherein:

said force apply means is a fluid pressure actuator.

22. A welding machine comprising:

a base operating machine including a machine frame, a welding current power supply having a welding electrode connection terminal and a tooling connection terminal, a programmable logic controller, and a machine connector plate having a set of first connector members mounted thereon, a tooling module having a module frame with welding tooling including a workpiece holder mounted on the module frame, said tooling module being movable as a unit between an uninstalled and an installed location relative to said base operating machine, first and second tool-side electrical contactor members for electrically connecting said tooling connection terminal of said power supply to said workpiece holder when said tooling module is in said installed location, a tooling module connector plate mounted on said module frame and having a set of second connector members mounted thereon, means for moving said machine connector plate from a retracted position to an extended position when said tooling module is in the installed location for operatively connecting said first and second sets of connector members, guide means for guiding movement of said tooling module on said machine frame between said uninstalled and installed locations, a plurality of module control programs stored in said programmable logic controller each of which is usable for controlling one of said tooling modules, each of said tooling modules having a code storage device thereon with stored code which uniquely identifies one of said module control programs, and a code reader on said base operating machine coacting with said code storage device for reading the code stored therein when said tooling module is in said installed location, said code reading device being electrically coupled with said programmable logic controller whereby the tooling module in the installed location may be operated under the control of the program identified by code stored in said storage device on such module.

23. The welding machine as defined in claim 22 wherein:

said code storage device comprises a set of binary code elements representing a predetermined binary number, said code reader comprises means responsive to said binary elements for producing a signal representing said binary number.

24. A welding machine comprising:

a base operating machine including a machine frame and at least one welding transformer mounted on the machine frame, said transformer having first and second secondary terminals, each of said first and second secondary terminals comprising a fixed contactor member having a flat contactor surface, a tooling module including tooling for electric welding, first and second movable contactor members which are fixedly mounted relative to said module frame for movement therewith and electrically connected with said tooling module, guide means on said machine frame and follower means on said tooling module for moving said tooling module between an uninstalled location relative to said machine frame and an installed location relative to said machine frame, each of said first and second movable contactor members comprising an elongated bar having a first end mechanically connected with said module frame and having a free end with a flat contactor surface thereon, said first and second flat surfaces being adapted for engagement with each other, said first and second fixed contactor members being located relative to said guide means and said first and second movable contactor members being located relative to said follower means so that said first movable contactor member is in alignment with said first fixed contactor member and so that said second movable contactor member is in alignment with said second fixed contactor member for rubbing engagement between said flat contactor surfaces when said tooling module is moved along said guide means to the installed location from the uninstalled location.

25. A welding machine as defined in claim 24 including:

a power actuator means for clamping said contactor surfaces into face-to-face engagement when said module is in said installed location.

26. A welding machine as defined in claim 25 wherein said power actuator means comprises a clamp jaw mounted for pivotal motion on said base operating machine and being disposed in spaced confronting relationship with said first and second fixed contactor members, respectively, said clamp jaw being movable from an open position to a closed position, said jaw being in an open position when said module is in its uninstalled location whereby said movable contactors are inserted between said jaw and said fixed contactors, said clamp jaw being movable to a closed position for clamping said movable contactor against said fixed contactor when said module is in said installed location, and actuator means coupled with said clamp jaws for moving said clamp jaws from said open to said closed position.

27. A welding machine as defined in claim 26 wherein there are two or more welding transformers.

* * * * *